US012718021B2

(12) United States Patent
Auchar et al.

(10) Patent No.: US 12,718,021 B2
(45) Date of Patent: Aug. 25, 2026

(54) SYSTEMS AND METHODS FOR PROVIDING EXPLAINABILITY OF NATURAL LANGUAGE PROCESSING

(71) Applicant: GE Precision Healthcare LLC, Waukesha, WI (US)

(72) Inventors: Hrithik Auchar, Bangalore (IN); Amar Kumar Gupta, Bangalore (IN); Mahima Shaha, Bangalore (IN)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 274 days.

(21) Appl. No.: 18/514,251

(22) Filed: Nov. 20, 2023

(65) Prior Publication Data

US 2025/0165712 A1 May 22, 2025

(51) Int. Cl.
*G06F 40/295* (2020.01)
*G06N 3/08* (2023.01)

(52) U.S. Cl.
CPC ............ *G06F 40/295* (2020.01); *G06N 3/08* (2013.01)

(58) Field of Classification Search
CPC .......... G06F 40/295; G06F 40/30; G06N 3/08
See application file for complete search history.

(56) References Cited

U.S. PATENT DOCUMENTS

2022/0129630 A1* 4/2022 Costa ...................... G06F 40/30
2022/0375246 A1* 11/2022 Akabe .................. G06F 40/216

OTHER PUBLICATIONS

Vu et al, A label Attention Model for ICD Coding from Clinical Text, https://arxiv.org/abs/2007.06351, Jul. 13, 2020 (Year: 2020).*

* cited by examiner

*Primary Examiner* — Linda Wong
(74) *Attorney, Agent, or Firm* — Amin, Turocy & Watson, LLP

(57) ABSTRACT

Systems or techniques that facilitate systems and methods for providing explainability of natural language processing are provided. In various embodiments, a system can access a plain text clinical sentence. In various aspects, the system can generate, via execution of a first machine learning model, an assertion status classification label for a word of interest in the plain text clinical sentence. In various instances, the system can extract, from a hidden attention layer of the first machine learning model, word-wise attention scores corresponding to the plain text clinical sentence and render, on an electronic display, both the assertion status classification label and a graphical representation of the word-wise attention scores. In various cases, the system can determine, via execution of a second machine learning model, a reliability score for the assertion status classification label, based on the word-wise attention scores, and can render the reliability score on the electronic display.

14 Claims, 15 Drawing Sheets

200

800

←Higher attention weights→

Tokens

Assertion Status

SYSTEMS AND METHODS FOR PROVIDING EXPLAINABILITY OF NATURAL LANGUAGE PROCESSING

TECHNICAL FIELD

The subject disclosure relates generally to natural language processing, and more specifically to systems and methods for providing explainability of natural language processing.

BACKGROUND

A deep learning neural network can be trained to classify the assertion statuses of words of interest recited in clinical natural language sentences. Unfortunately, existing techniques for facilitating such classification are insufficiently interpretable or explainable.

Accordingly, systems or techniques that can improve the explainability of assertion status classification can be desirable.

SUMMARY

The following presents a summary to provide a basic understanding of one or more embodiments. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate systems and methods for providing explainability of natural language processing are described.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access a plain text clinical sentence. In various aspects, the computer-executable components can comprise an assertion component that can generate, via execution of a first machine learning model, an assertion status classification label for a word of interest in the plain text clinical sentence. In various instances, the computer-executable components can comprise a display component that can extract, from a hidden attention layer of the first machine learning model, word-wise attention scores corresponding to the plain text clinical sentence and that can render, on an electronic display, both the assertion status classification label and a graphical representation of the word-wise attention scores. In various cases, the computer-executable components can comprise a reliability component that can determine, via execution of a second machine learning model, a reliability score for the assertion status classification label, based on the word-wise attention scores, wherein the display component can render the reliability score on the electronic display.

According to one or more embodiments, a computer-implemented method is provided. In various embodiments, the computer-implemented method can comprise accessing, by a device operatively coupled to a processor, a plain text clinical sentence. In various aspects, the computer-implemented method can comprise generating, by the device and via execution of a first machine learning model, an assertion status classification label for a word of interest in the plain text clinical sentence. In various instances, the computer-implemented method can comprise extracting, by the device and from a hidden attention layer of the first machine learning model, word-wise attention scores corresponding to the plain text clinical sentence. In various cases, the computer-implemented method can comprise rendering, by the device and on an electronic display, both the assertion status classification label and a graphical representation of the word-wise attention scores. In various aspects, the computer-implemented method can comprise determining, by the device and via execution of a second machine learning model, a reliability score for the assertion status classification label, based on the word-wise attention scores; and rendering, by the device, the reliability score on the electronic display.

According to one or more embodiments, a computer program product for facilitating systems and methods for providing explainability of natural language processing is provided. In various embodiments, the computer program product can comprise a non-transitory computer-readable memory having program instructions embodied therewith. In various aspects, the program instructions can be executable by a processor to cause the processor to access a plain text sentence. In various instances, the program instructions can be further executable to cause the processor to generate, via execution of a first machine learning model, an inferencing task result based on the plain text sentence. In various cases, the program instructions can be further executable to cause the processor to extract, from a hidden attention layer of the first machine learning model, word-wise attention scores corresponding to the plain text sentence. In various aspects, the program instructions can be further executable to cause the processor to render, on an electronic display, both the inferencing task result and a graphical representation of the word-wise attention scores. In various instances, the program instructions can be further executable to cause the processor to: determine, via execution of a second machine learning model, a reliability score for the inferencing task result, based on the word-wise attention scores; and to render the reliability score on the electronic display.

DETAILED DESCRIPTION

Figure 1:
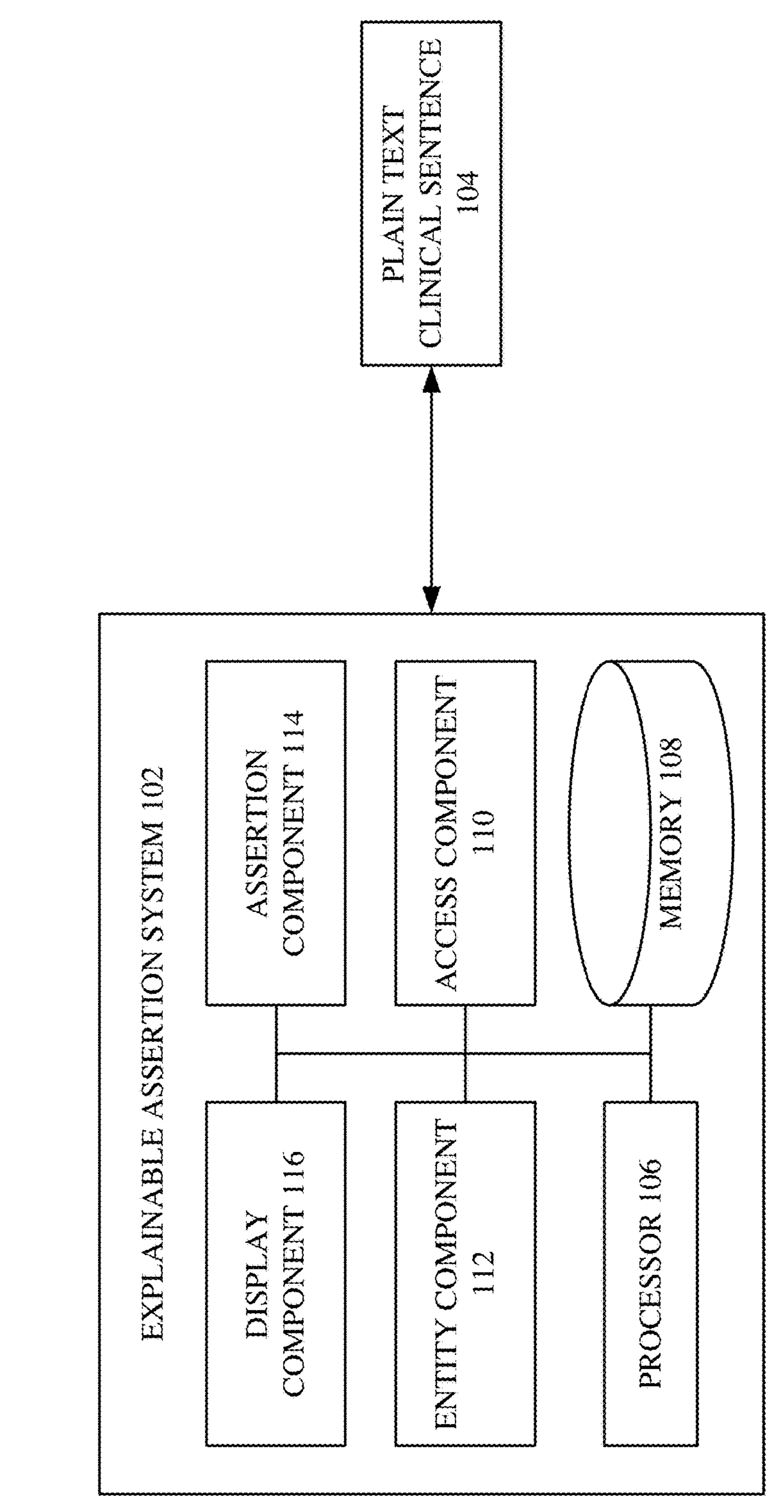
FIG. 1 illustrates a block diagram of an example, non-limiting system that facilitates systems and methods for providing explainability of natural language processing in accordance with one or more embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A deep learning neural network can be trained (e.g., in supervised fashion, in unsupervised fashion, in reinforcement learning fashion) to classify the assertion statuses of words of interest recited in clinical natural language sentences. For instance, a medical professional can write or type a plain text sentence into a medical record or medical report of a patient, that plain text sentence can recite a particular symptom, pathology, or surgical procedure that somehow relates diagnostically or prognostically to the patient, and the deep learning neural network can predict or infer the assertion status of that symptom, pathology, or surgical procedure. That is, the deep learning neural network can predict or infer what the plain text sentence is trying to convey about that symptom, pathology, or surgical procedure (e.g., can predict or infer whether that plain text sentence states or asserts that the symptom, pathology, or surgical procedure is present in the patient, is absent in the patient, is recommended for the patient, was previously detected in or performed on the patient, or is associated with a familial relative of the patient). Such assertion statuses can be subsequently leveraged to perform follow-on or downstream processing of such clinical natural language sentences (e.g., to filter, sort, or rank such sentences so as to facilitate clinical decision-making).

Unfortunately, existing techniques for facilitating such classification are insufficiently interpretable or explainable. Indeed, when existing techniques are implemented, the deep learning neural network can be considered as a black-box that receives as input a clinical natural language sentence having a flagged word of interest and that produces as output a classification label indicating a predicted or inferred assertion status for that flagged word of interest. In other words, when existing techniques are implemented, it can be unclear why the deep learning neural network arrived at that assertion status. In still other words, when existing techniques are implemented, the deep learning neural network can be considered as providing a bare conclusion without showing its work. Accordingly, it can be difficult, if not impossible, to audit, trust, or otherwise have confidence in the outputted classification label.

Accordingly, systems or techniques that can improve the explainability of assertion status classification can be desirable.

Various embodiments described herein can address one or more of these technical problems. One or more embodiments described herein can include systems, computer-implemented methods, apparatus, or computer program products that can facilitate systems and methods for providing explainability of natural language processing. In particular, various embodiments described herein can involve configuring or training a deep learning neural network to generate assertion status classification labels, where the deep learning neural network can be outfitted or equipped with a hidden attention layer that can produce word-wise attention scores. That is, when the deep learning neural network is fed a clinical natural language sentence as input, the hidden attention layer can compute a respective attention score for each word in the clinical natural language sentence, and such attention scores can be leveraged by the remainder of the deep learning neural network to produce an assertion status classification label for whatever word of interest is flagged in the clinical natural language sentence.

Such attention scores can be considered as enabling the deep learning neural network to focus on (e.g., to pay more attention to) particular words within the clinical natural language sentence, thereby improving the accuracy of the deep learning neural network. Indeed, it can be the case that not all words in the clinical natural language sentence are dispositive with respect to assertion status of the flagged word of interest. So, the hidden attention layer can be considered as focusing more on (e.g., as assigning higher or heavier attention scores to) whichever words in the clinical natural language sentence are more dispositive with respect to assertion status of the flagged word of interest, and the hidden attention layer can conversely be considered as focusing less on (e.g., as assigning lower or lighter attention scores to) whichever words in the clinical natural language sentence are less dispositive with respect to assertion status of the flagged word of interest.

However, as the inventors of various embodiments described herein recognized, such attention scores can be considered as not only improving the performance or accuracy of the deep learning neural network; such attention scores can also be considered as improving the explainability, interpretability, or transparency of the deep learning neural network. After all, if the hidden attention layer assigns a high-magnitude attention score to a particular word in the clinical natural language sentence, such high-magnitude attention score can be considered as an indication that the deep learning neural network is heavily relying upon that particular word in generating an assertion status classification label. On the other hand, if the hidden attention layer assigns a low-magnitude attention score to a specific word in the clinical natural language sentence, such low-magnitude attention score can be considered as an indication that the deep learning neural network is not heavily relying upon that specific word in generating an assertion status classification label. That is, the present inventors realized that the word-wise attention scores produced by the hidden attention layer can be considered as the deep learning neural network showing its work (e.g., showing which words the deep learning neural network most or least relies upon when inferring or predicting an assertion status). Accordingly, various embodiments described herein can involve extracting such word-wise attention scores from the hidden attention layer and visually rendering a graphical representation of such word-wise attention scores on an electronic display. Thus, a user or technician can audit the deep learning neural network by visually inspecting such graphical representation. For instance, if the graphical representation shows that the deep learning neural network focused on expected or reasonable words in the clinical natural language sentence, then the user or technician can conclude that the assertion status predicted or inferred by the deep learning neural network can be trusted. In contrast, if the graphical representation instead shows that the deep learning neural network focused on unexpected or unreasonable words in the clinical natural language sentence, then the user or technician can conclude that the assertion status predicted or inferred by the deep learning neural network cannot be trusted. Furthermore, some embodiments described herein can even involve configuring or training another deep learning neural network to receive as input the assertion status classification label and the word-wise attention scores produced by the deep learning neural network, and to produce as output a reliability score for the assertion status classification label.

In any case, various embodiments described herein can be considered as leveraging word-wise attention scores as an explainability or interpretability tool so as to judge the reliability or trustworthiness of assertion status classifications. Existing techniques do not leverage word-wise attention scores in this way.

Indeed, as far as the present inventors are aware, existing techniques do not incorporate hidden attention layers at all into assertion status classifiers.

Even if existing techniques did incorporate hidden attention layers into assertion status classifiers, they would do so only as a hidden, internal mechanism by which to improve assertion status classification accuracy. After all, as far as the present inventors are aware, existing techniques do not extract or provide attention scores as an auxiliary output of an assertion status classifier. Thus, a user or technician of the assertion status classifier is not made aware of such attention scores at all, meaning that the user or technician is not apprised of where the assertion status classifier is focusing its attention when performing assertion status classification.

Moreover, even if existing techniques did extract or provide attention scores as an auxiliary output of an assertion status classifier, such attention scores would not necessarily carry readily-understandable semantic meaning. After all, a hidden attention layer can be located anywhere between an input layer and an output layer of the assertion status classifier. Accordingly, the attention scores computed by that hidden attention layer can serve as respective weights for whatever features or activation maps that are received by the hidden attention layer. Depending upon the location of the hidden attention layer, such features or activation maps can be considered as hidden, abstract, numerical representations (e.g., latent vectors) that have no readily-identifiable or interpretable meaning. In other words, depending upon the location of the hidden attention layer, the attention scores produced by the hidden attention layer would not necessarily respectively correspond to the words of whatever clinical natural language sentence is inputted to the assertion status classifier. So, even if a user or technician of the assertion status classifier were made aware of those attention scores, such attention scores would not necessarily convey to the user or technician any assertion-status-relevant information.

Various embodiments described herein can be considered as a computerized tool (e.g., any suitable combination of computer-executable hardware or computer-executable software) that can facilitate improved explainability for natural language processing via word-wise attention extraction. In various aspects, such computerized tool can comprise an access component, an entity component, an assertion component, or a display component.

In various embodiments, there can be a plain text clinical sentence. In various aspects, the plain text clinical sentence can be any suitable unstructured, natural language sentence or sentence fragment comprising any suitable number of words. In various instances, the plain text clinical sentence can be a constituent part of a medical record pertaining to a medical patient. As a non-limiting example, the plain text clinical sentence can be written or typed by a medical professional who is attending to the medical patient, and the plain text clinical sentence can convey some diagnostically-relevant or prognostically-relevant information regarding the medical patient.

In any case, it can be desired to perform explainable assertion status classification for or with respect to the plain text clinical sentence. As described herein, the computerized tool can facilitate such explainable assertion status classification.

In various embodiments, the access component of the computerized tool can electronically receive or otherwise electronically access the plain text clinical sentence. In some aspects, the access component can electronically retrieve the plain text clinical sentence from any suitable centralized or decentralized data structures (e.g., graph data structures, relational data structures, hybrid data structures), whether remote from or local to the access component. In any case, the access component can electronically obtain or access the plain text clinical sentence, such that other components of the computerized tool can electronically interact with (e.g., read, write, edit, copy, manipulate) the plain text clinical sentence.

In various embodiments, the entity component of the computerized tool can electronically identify a word of interest within the plain text clinical sentence. In various aspects, the word of interest can be any suitable word (or, more generally, any suitable term or phrase which might comprise more than one word) that is recited within the plain text clinical sentence and that carries some sort of diagnostic or prognostic meaning. As some non-limiting examples, the word of interest can be a pathology, a symptom, or a surgical procedure that is recited within the plain text clinical sentence. In various instances, the entity component can identify the word of interest by applying any suitable named entity recognition technique (e.g., statistical named entity recognition, transformer-based named entity recognition) to the plain text clinical sentence. Note that, in some cases, the entity component can identify more than one word of interest (e.g., more than one pathology, more than one symptom, more than one surgical procedure) within the plain text clinical sentence.

In various embodiments, the assertion component can electronically store, maintain, control, or otherwise access a first deep learning neural network. In various aspects, the first deep learning neural network can exhibit any suitable deep learning internal architecture. For example, the first deep learning neural network can include any suitable numbers of any suitable types of layers (e.g., input layer, one or more hidden layers, output layer, any of which can be convolutional layers, dense layers, non-linearity layers, pooling layers, batch normalization layers, or padding layers). As another example, the first deep learning neural network can include any suitable numbers of neurons in various layers (e.g., different layers can have the same or different numbers of neurons as each other). As yet another example, the first deep learning neural network can include any suitable activation functions (e.g., softmax, sigmoid, hyperbolic tangent, rectified linear unit) in various neurons (e.g., different neurons can have the same or different activation functions as each other). As still another example, the first deep learning neural network can include any suitable interneuron connections or interlayer connections (e.g., forward connections, skip connections, recurrent connections).

In various aspects, the first deep learning neural network can be configured to perform assertion status classification. Accordingly, the assertion component can electronically flag the word of interest within the plain text clinical sentence and can electronically execute the first deep learning neural network on the flagged version of the plain text clinical sentence. In various instances, such execution can cause the first deep learning neural network to produce as output an assertion status classification label. Furthermore, the first deep learning neural network can comprise a hidden attention layer that can compute or otherwise generate word-wise attention scores for the plain text clinical sentence. In various cases, those word-wise attention scores can pass through a remainder of the first deep learning neural network, such that the assertion status classification label can be considered as being based on the word-wise attention scores.

In various cases, the assertion status classification label can be any suitable electronic data that indicates to which one of two or more possible assertion status classes the word of interest is inferred or predicted to belong (e.g., a present class, an absent class, an uncertain class, an historical class, a conditional class).

In various aspects, the word-wise attention scores can comprise a respective attention score for each word of the plain text clinical sentence. In various instances, an attention score can be a scalar whose magnitude indicates how important, consequential, or dispositive a respective word in the plain text clinical sentence is (in the opinion of the first deep learning neural network) with respect to the assertion status classification label. So, if the hidden attention layer assigns a low-value attention score (e.g., closer to 0) to a particular word, that particular word can be considered as not contributing much to the assertion status classification label. In contrast, if the hidden attention layer assigns a high-value attention score (e.g., closer to 1) to a particular word, that particular word can be considered as contributing heavily to the assertion status classification label. In various cases, an input layer of the first deep learning neural network can be an embedding layer that is configured to compute a respective embedding vector (e.g., a respective latent vector representation) for each word in the plain text clinical sentence, and the hidden attention layer can be located immediately downstream of that embedding layer. Accordingly, the hidden attention layer can be receive as input a respective embedding vector for each word in the plain text clinical sentence, and the hidden attention layer can compute a respective attention score for each of such embedding vectors (and thus for each word in the plain text clinical sentence). That is, placing the hidden attention layer immediately downstream of the embedding layer can cause or force the hidden attention layer to produce word-wise attention scores. In various cases, the hidden attention layer can compute the word-wise attention scores in query-key-value fashion, where the embedding vector of the word of interest can be treated as the query vector, where the embedding vectors of all the words in the plain text clinical sentence can be collectively treated as the key vector, and where the embedding vectors of all the words in the plain text clinical sentence can also be collectively treated as the value vector.

In various embodiments, the display component of the computerized tool can electronically render the assertion status classification label on any suitable electronic display (e.g., on any suitable computer screen or computer monitor). In various aspects, the display component can further electronically extract the word-wise attention scores from the hidden attention layer and can electronically render those word-wise attention scores, or any suitable graphical representation thereof, on the electronic display. Accordingly, a user or technician can be informed not just of the assertion status classification label, but also of how much or how little each particular word in the plain text clinical sentence contributed to the assertion status classification label. That is, the user or technician can become apprised of which specific words in the plain text clinical sentence the first deep learning neural network focused on or ignored when generating the assertion status classification label. In various cases, this can allow the user or technician to audit or otherwise evaluate a trustworthiness of the assertion status classification label. For instance, if the first deep learning neural network focused on expected or reasonable words, the assertion status classification label can be considered as trustworthy. Instead, if the first deep learning neural network focused on unexpected or unreasonable words, the assertion status classification label can be considered as untrustworthy.

As a non-limiting example, suppose that the plain text clinical sentence is "Patient maintains an epidural and reports no stomach pain," suppose that the word of interest is "stomach pain," and suppose that the assertion status classification label indicates an absent class. This can be interpreted to mean that the first deep learning neural network has predicted or inferred that the plain text clinical sentence is asserting the absence of "stomach pain" in the medical patient. Such classification is correct; after all, the plain text clinical sentence is asserting "no" stomach pain. But, despite such correctness, the assertion status classification label might nevertheless be untrustworthy, such as if the first deep learning neural network generated it via faulty reasoning. In various cases, such faulty reasoning can be revealed by the word-wise attention scores. Indeed, suppose that the word-wise attention scores indicate that the first deep learning neural network predicted or inferred that "stomach pain" belongs to the absent class by focusing on the words "epidural" and "and." The words "epidural" and "and," as used in the plain text clinical sentence, have almost no semantic relevance to "stomach pain," so the fact that the first deep learning neural network focused on (e.g., assigned higher attention weights to) "epidural" and "and" when classifying the assertion status of "stomach pain" can be interpreted as indicating that something is wrong with the first deep learning neural network. On the other hand, suppose that the word-wise attention scores indicate that the first deep learning neural network predicted or inferred that "stomach pain" belongs to the absent class by focusing on the words "reports" and "no." The words "reports" and "no," as used in the plain text clinical sentence, have very much semantic relevance to "stomach pain," so the fact that the first deep learning neural network focused on (e.g., assigned higher attention weights to) "reports" and "no" when classifying the assertion status of "stomach pain" can be interpreted as indicating that the first deep learning neural network is functioning appropriately or as expected.

As another non-limiting example, suppose that the plain text clinical sentence is "Patient maintains an epidural and reports no stomach pain," suppose that the word of interest is "epidural," and suppose that the assertion status classification label indicates a present class. This can be interpreted to mean that the first deep learning neural network has predicted or inferred that the plain text clinical sentence is asserting the presence of "epidural" in the medical patient. Such classification is correct; after all, the plain text clinical sentence is asserting that the epidural has been "maintain [ed]." But, despite such correctness, the assertion status classification label might nevertheless be untrustworthy due to faulty reasoning. Just as above, such faulty reasoning can be revealed by the word-wise attention scores. Indeed, suppose that the word-wise attention scores indicate that the first deep learning neural network predicted or inferred that "epidural" belongs to the present class by focusing on the word "maintains." The word "maintains," as used in the plain text clinical sentence, has very much semantic relevance to "epidural," so the fact that the first deep learning neural network focused on (e.g., assigned a higher attention weight to) "maintains" when classifying the assertion status of "epidural" can be interpreted as indicating that the first deep learning neural network is functioning appropriately. On the other hand, suppose that the word-wise attention scores indicate that the first deep learning neural network predicted or inferred that "epidural" belongs to the present class by focusing on the word "stomach." The word "stomach," as used in the plain text clinical sentence, has almost no semantic relevance to "epidural," so the fact that the first deep learning neural network focused on (e.g., assigned a higher attention weight to) "stomach" when classifying the assertion status of "epidural" can be interpreted as indicating that the first deep learning neural network is not functioning appropriately.

As explained above, the user or technician can manually inspect the graphical representation of the word-wise attention scores to draw conclusions about the trustworthiness of the assertion status classification label. However, this is a mere non-limiting example. In other cases, computerized or automated techniques can be leveraged so as to generate conclusions or determinations about the trustworthiness of the assertion status classification label based on the word-wise attention scores.

Indeed, in some embodiments, the computerized tool can further comprise a reliability component. In various aspects, the reliability component can electronically store, maintain, control, or otherwise access a second deep learning neural network. In various instances, the second deep learning neural network can exhibit any suitable deep learning internal architecture. For example, the second deep learning neural network can include any suitable numbers of any suitable types of layers (e.g., input layer, one or more hidden layers, output layer, any of which can be convolutional layers, dense layers, non-linearity layers, pooling layers, batch normalization layers, or padding layers). As another example, the second deep learning neural network can include any suitable numbers of neurons in various layers (e.g., different layers can have the same or different numbers of neurons as each other). As yet another example, the second deep learning neural network can include any suitable activation functions (e.g., softmax, sigmoid, hyperbolic tangent, rectified linear unit) in various neurons (e.g., different neurons can have the same or different activation functions as each other). As still another example, the second deep learning neural network can include any suitable interneuron connections or interlayer connections (e.g., forward connections, skip connections, recurrent connections).

In various cases, the second deep learning neural network can be configured to estimate reliability of assertion status determinations, based on whatever word-wise attention scores are associated with those assertion status determinations. Accordingly, the reliability component can electronically execute the second deep learning neural network on the flagged version of the plain text clinical sentence, on the assertion status classification label, and on the word-wise attention scores. In various instances, such execution can cause the second deep learning neural network to produce as output a reliability score. In various cases, the reliability score can be a scalar whose magnitude indicates how confident or trustworthy the assertion status classification label is, given the word-wise attention scores. In other words, the second deep learning neural network can be considered as evaluating the word-wise attention scores, so as to determine whether or not the assertion status classification label is the result of poor reasoning. In still other words, the second deep learning neural network can be considered as determining whether or not the first deep learning neural network generated the assertion status classification label by paying attention to the various words of the plain text clinical sentence in a trustworthy fashion or pattern or instead in an untrustworthy fashion or pattern.

In any case, the word-wise attention scores as described herein can be extracted and leveraged so as to improve the explainability, interpretability, or transparency of the first deep learning neural network.

To help cause the assertion status classification label, the word-wise attentions scores, and the reliability score described above to be accurate, the first and second deep learning neural networks can first undergo training. In various aspects, the computerized tool described herein can facilitate such training in any suitable fashion (e.g., in supervised fashion) based on any suitable training dataset.

Various embodiments described herein can be employed to use hardware or software to solve problems that are highly technical in nature (e.g., to facilitate improved explainability for natural language processing via word-wise attention extraction), that are not abstract and that cannot be performed as a set of mental acts by a human. Further, some of the processes performed can be performed by a specialized computer (e.g., deep learning neural networks having internal parameters such as convolutional kernels) for carrying out defined acts related to natural language processing. For example, such defined acts can include: accessing, by a device operatively coupled to a processor, a plain text clinical sentence; generating, by the device and via execution of a first deep learning neural network, an assertion status classification label for a word of interest in the plain text clinical sentence; extracting, by the device and from a hidden attention layer of the first deep learning neural network, word-wise attention scores corresponding to the plain text clinical sentence; and rendering, by the device and on an electronic display, both the assertion status classification label and a graphical representation of the word-wise attention scores. In various cases, such defined acts can further include: determining, by the device and via execution of a second deep learning neural network, a reliability score for the assertion status classification label, based on the word-wise attention scores; and rendering, by the device, the reliability score on the electronic display.

Such defined acts are not performed manually by humans. Indeed, neither the human mind nor a human with pen and paper can: electronically execute a first artificial neural network on an unstructured clinical sentence, thereby yielding an assertion status classification label; electronically render on a computerized display both the assertion status classification label and hidden word-wise attention scores extracted from the first artificial neural network; or electronically execute a second artificial neural network on the hidden word-wise attention scores, thereby yielding a reliability/trustworthiness score for the assertion status classification label. Indeed, an artificial neural network is an inherently-computerized construct that simply cannot be meaningfully executed or trained in any way by the human mind without computers. A computerized tool that can execute artificial neural networks on unstructured text so as to generate assertion status classifications and reliability/trustworthiness scores for those classifications is likewise inherently-computerized and cannot be implemented in any sensible, practical, or reasonable way without computers.

Moreover, various embodiments described herein can integrate into a practical application various teachings relating to improved explainability for natural language processing via word-wise attention extraction. As described above, existing techniques perform assertion status classification in a wholly black-box fashion that suffers from a lack of explainability or interpretability. Indeed, existing techniques train a deep learning neural network to produce an assertion status classification label for a clinical natural language sentence, without showing any work, reasoning, or rationale for such assertion status classification label. Accordingly, the deep learning neural network of existing techniques cannot be easily audited or evaluated for trustworthiness.

As the present inventors recognized, such lack of explainability or interpretability can be ameliorated by outfitting or equipping the deep learning neural network with an attention layer that is configured to produce word-wise attention scores. As the present inventors realized, such word-wise attention scores not only boost performance of the deep learning neural network (e.g., improve classification accuracy), but such word-wise attention scores can also be leveraged or exploited to increase the explainability or interpretability of the deep learning neural network. Indeed, the present inventors recognized that such word-wise attention scores can be considered as showing how much or how little the deep learning neural network focuses on each word in the clinical natural language sentence when generating the assertion status classification label. That is, the word-wise attention scores can be considered as the deep learning neural network showing its work for why or how it arrives at the assertion status classification label. If the word-wise attention scores show that the deep learning neural network focused on expected, reasonable, or otherwise appropriate words, the assertion status classification label can be considered as being trustworthy or confident (e.g., as being the result of valid or sound reasoning). In contrast, if the word-wise attention scores instead show that the deep learning neural network focused on unexpected, unreasonable, or otherwise inappropriate words, the assertion status classification label can instead be considered as being untrustworthy or unconfident (e.g., as being the result of invalid or unsound reasoning). Existing techniques do not utilize or leverage word-wise attention scores to evaluate assertion status classification trustworthiness.

Additionally, word-wise attention scores can also be considered as heightening assertion status classification accuracy. Indeed, training the deep learning neural network to internally compute word-wise attention scores can be considered as teaching the deep learning neural network to identify and focus more on whichever inputted words are more dispositive to assertion status classification. Accordingly, the deep learning neural network can achieve a threshold level of assertion status classification accuracy using fewer training epochs (e.g., reduced training time), or the deep learning neural network can achieve a heightened level of assertion status classification accuracy using a threshold number of training epochs (e.g., boosted performance).

For at least these reasons, various embodiments described herein facilitate assertion status classification with heightened or increased explainability, as compared to existing techniques. Thus, various embodiments described herein certainly constitute a tangible and concrete technical improvement or technical advantage in the field of natural language processing. Accordingly, such embodiments clearly qualify as useful and practical applications of computers.

Furthermore, various embodiments described herein can control real-world tangible devices based on the disclosed teachings. For example, various embodiments described herein can electronically train or execute real-world deep learning neural networks on real-world unstructured text and can electronically render real-world results (e.g., classification labels, word-wise attention scores, reliability scores) on real-world computer screens.

It should be appreciated that the herein figures and description provide non-limiting examples of various embodiments and are not necessarily drawn to scale.

FIG. 1 illustrates a block diagram of an example, non-limiting system 100 that can facilitate systems and methods for providing explainability of natural language processing in accordance with one or more embodiments described herein. As shown, an explainable assertion system 102 can be electronically integrated, via any suitable wired or wireless electronic connections, with a plain text clinical sentence 104.

In various embodiments, the plain text clinical sentence 104 can be any suitable unstructured textual sentence or sentence fragment that is written in any suitable language (e.g., English, Spanish, French). In various aspects, the plain text clinical sentence 104 can comprise any suitable number of words. In various cases, the plain text clinical sentence 104 can substantively pertain to any suitable medical patient (e.g., human, animal, or otherwise). For instance, the plain text clinical sentence 104 can be written or typed by any suitable medical professional (e.g., nurse, physician) into an electronic medical record or electronic medical chart of the medical patient, using any suitable human-computer interface device (e.g., keyboard, touchscreen, voice dictation system). Accordingly, the plain text clinical sentence 104 can carry some diagnostic or prognostic relevance with respect to the medical patient. For instance, the plain text clinical sentence 104 can describe or otherwise pertain to medical symptoms experienced or not experienced by the medical patient, to surgical procedures undergone or not undergone by the medical patient, to a medical history of the medical patient, or to a medical history of a familial relative of the medical patient.

As a non-limiting example, the plain text clinical sentence 104 can be: "A follow-up CT scan was done, which confirmed evidence for splenomegaly." As another non-limiting example, the plain text clinical sentence 104 can be: "The patient had bilateral cataract extraction in 2007." As even another non-limiting example, the plain text clinical sentence 104 can be: "He also became short of breath with climbing a flight of stairs." As yet another non-limiting example, the plain text clinical sentence 104 can be: "Father with Alzheimer." As still another non-limiting example, the plain text clinical sentence 104 can be: "Patient with severe fever and sore throat."

In any case, it can be desired to perform explainable assertion status classification on the plain text clinical sentence 104. As described herein, the explainable assertion system 102 can achieve this.

In various embodiments, the explainable assertion system 102 can comprise a processor 106 (e.g., computer processing unit, microprocessor) and a non-transitory computer-readable memory 108 that is operably or operatively or communicatively connected or coupled to the processor 106. The non-transitory computer-readable memory 108 can store computer-executable instructions which, upon execution by the processor 106, can cause the processor 106 or other components of the explainable assertion system 102 (e.g., access component 110, entity component 112, assertion component 114, display component 116) to perform one or more acts. In various embodiments, the non-transitory computer-readable memory 108 can store computer-executable components (e.g., access component 110, entity component 112, assertion component 114, display component 116), and the processor 106 can execute the computer-executable components.

In various embodiments, the explainable assertion system 102 can comprise an access component 110. In various aspects, the access component 110 can electronically receive or otherwise electronically access the plain text clinical sentence 104. In various instances, the access component 110 can electronically retrieve the plain text clinical sentence 104 from any suitable centralized or decentralized data structures (not shown) or from any suitable centralized or decentralized computing devices (not shown). As a non-limiting example, the access component 110 can electronically retrieve the plain text clinical sentence 104 from whatever computing device (e.g., desktop computer, laptop computer, smart phone, tablet, medical imaging scanner) into which or onto which the plain text clinical sentence 104 was electronically written or typed. In any case, the access component 110 can electronically obtain or access the plain text clinical sentence 104, such that other components of the explainable assertion system 102 can electronically interact (e.g., by proxy) with the plain text clinical sentence 104.

In various embodiments, the explainable assertion system 102 can comprise an entity component 112. In various aspects, the entity component 112 can, as described herein, identify a word of interest within the plain text clinical sentence 104.

In various embodiments, the explainable assertion system 102 can comprise an assertion component 114. In various instances, the assertion component 114 can, as described herein, execute a deep learning neural network on the plain text clinical sentence 104, so as to generate an assertion status classification label for the word of interest. In various cases, the deep learning neural network can comprise a hidden attention layer that can compute, during such execution, word-wise attention scores for the plain text clinical sentence 104.

In various embodiments, the explainable assertion system 102 can comprise a display component 116. In various aspects, the display component 116 can, as described herein, visually render both the assertion status classification label and the word-wise attention scores on any suitable electronic display.

Figure 2:
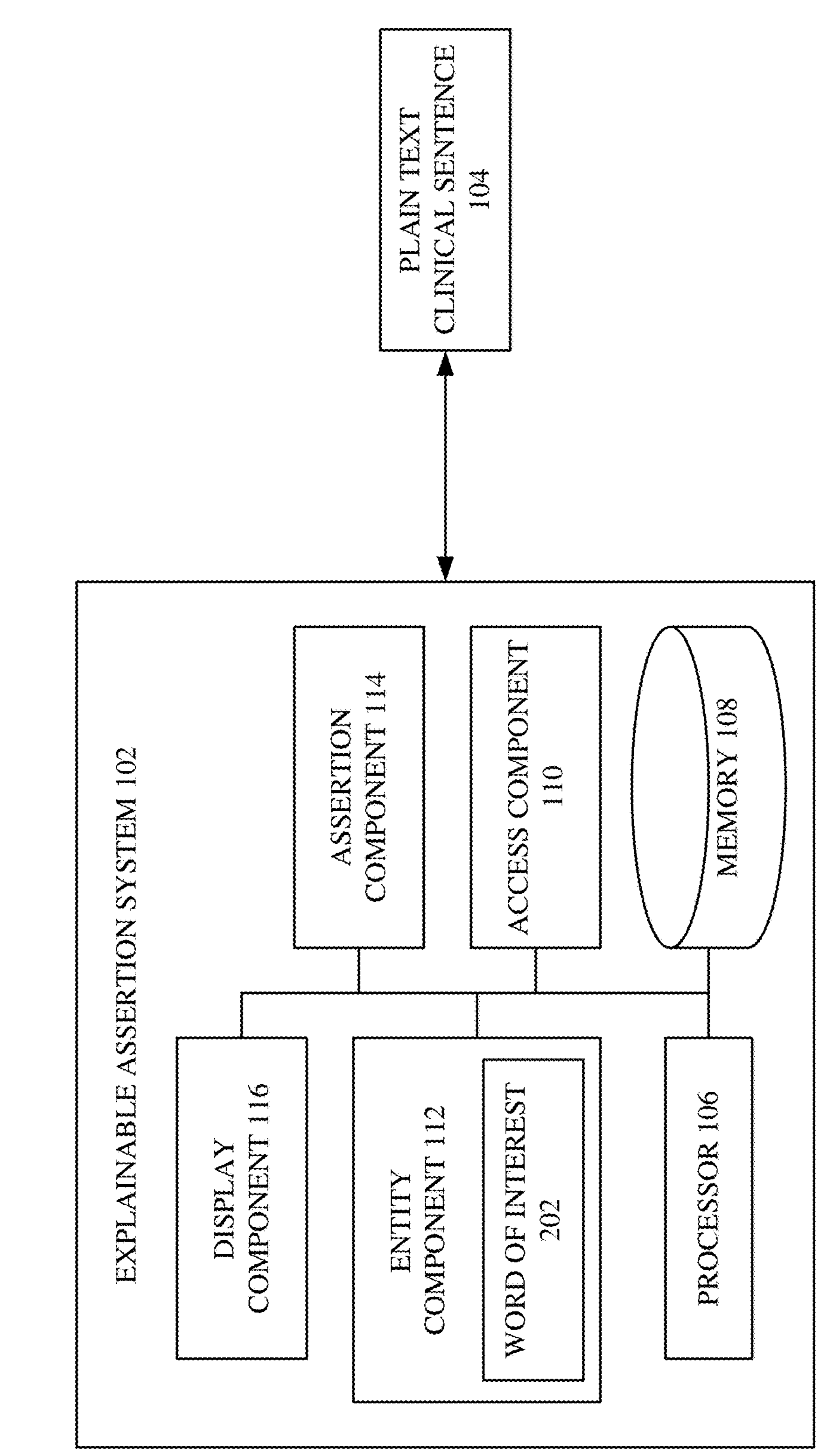
FIG. 2 illustrates a block diagram of an example, non-limiting system including a word of interest that facilitates systems and methods for providing explainability of natural language processing in accordance with one or more embodiments described herein.

FIG. 2 illustrates a block diagram of an example, non-limiting system 200 including a word of interest that can facilitate systems and methods for providing explainability of natural language processing in accordance with one or more embodiments described herein. As shown, the system 200 can, in some cases, comprise the same components as the system 100, and can further comprise a word of interest 202.

In various embodiments, the entity component 112 can electronically identify the word of interest 202 from within the plain text clinical sentence 104. Non-limiting aspects are described with respect to FIG. 3.

Figure 3:
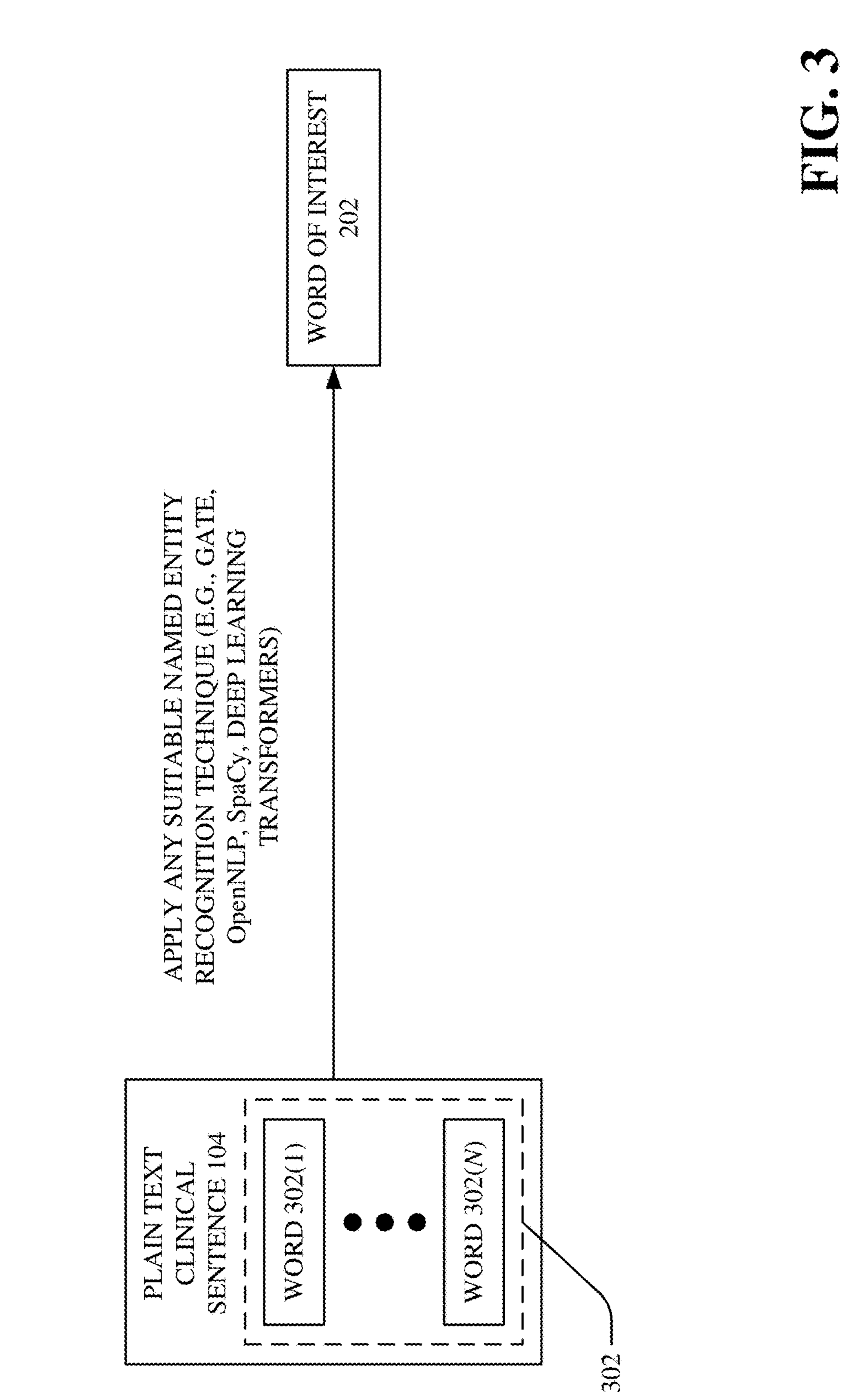
FIG. 3 illustrates an example, non-limiting block diagram showing how a word of interest can be identified in accordance with one or more embodiments described herein.

FIG. 3 illustrates an example, non-limiting block diagram 300 showing how the word of interest 202 can be identified in accordance with one or more embodiments described herein.

In various aspects, as shown, the plain text clinical sentence 104 can be considered as a sequence of words 302. In various instances, the sequence of words 302 can comprise n words, for any suitable positive integer n: a word 302(1) to a word 302(*n*). In various cases, any of the sequence of words 302 can have any suitable character lengths or spellings.

In various aspects, the word of interest 202 can be any of those n words that names or otherwise refers to any suitable discrete, medical, semantic concept. As a non-limiting example, the word of interest 202 can be the name of any suitable medical symptom that is explicitly recited in the plain text clinical sentence 104. As another non-limiting example, the word of interest 202 can be the name of any suitable medical disease or medical pathology that is explicitly recited in the plain text clinical sentence 104. As still another non-limiting example, the word of interest 202 can be the name of any suitable surgical procedure or surgical operation that is explicitly recited in the plain text clinical sentence 104. As even another non-limiting example, the word of interest 202 can be the name of any suitable medication or medical drug that is explicitly recited in the plain text clinical sentence 104. As yet another non-limiting example, the word of interest 202 can be the name of any suitable medical treatment that is explicitly recited in the plain text clinical sentence 104. As another non-limiting example, the word of interest 202 can be the name of any suitable medical diagnostic test that is explicitly recited in the plain text clinical sentence 104.

Note that, in some cases, the word of interest 202 can be a single word that is recited in the plain text clinical sentence 104. As a non-limiting example, suppose that the plain text clinical sentence 104 is: "A follow-up CT scan was done, which confirmed evidence for splenomegaly." In such case, the word of interest 202 can be "splenomegaly," which can be considered as the name of a particular medical pathology. As another non-limiting example, suppose that the plain text clinical sentence 104 is: "Father with Alzheimer." In such case, the word of interest 202 can be "Alzheimer," which can be considered as the name of another particular medical pathology.

However, note that, in other cases, the word of interest 202 can be two or more adjacent words that are recited in the plain text clinical sentence 104. As a non-limiting example, suppose again that the plain text clinical sentence 104 is: "A follow-up CT scan was done, which confirmed evidence for splenomegaly." In such case, the word of interest 202 can be "CT scan," which can be considered as a discrete name or term for a particular type of medical diagnostic test. As another non-limiting example, suppose that the plain text clinical sentence 104 is "The patient had bilateral cataract extraction in 2007." In such case, the word of interest 202 can be "bilateral cataract extraction," which can be considered as the discrete name of a particular type of surgical procedure. As still another non-limiting example, suppose that the plain text clinical sentence 104 is "He also became short of breath with climbing a flight of stairs." In such case, the word of interest 202 can be "short of breath," which can be considered as the discrete name of a particular type of medical symptom.

In any case, the entity component 112 can identify the word of interest 202, by electronically applying any suitable named entity recognition technique (e.g., also referred to as entity chunking or entity extraction) to the plain text clinical sentence 104. As a non-limiting example, the entity component 112 can apply any suitable rule-based named entity recognition technique to the plain text clinical sentence 104, such as those available via the Apache OpenNLP software platform. As another non-limiting example, the entity component 112 can apply any suitable statistical named entity recognition technique to the plain text clinical sentence 104, such as those available via the SpaCY software platform. As even another non-limiting example, the entity component 112 can apply any suitable deep learning transformer-based named entity recognition technique to the plain text clinical sentence 104.

Note that, although the figures depict the entity component 112 as identifying only a single word of interest (e.g., only a single discrete, medical, semantic concept) in the plain text clinical sentence 104, this is a mere non-limiting example for ease of explanation and illustration. In other embodiments, the entity component 112 can identify any suitable number of different or various words of interest (e.g., of different or various discrete, medical, semantic concepts) in the plain text clinical sentence 104. As a non-limiting example, suppose that the plain text clinical sentence 104 is: "Patient with severe fever and sore throat." In such case, "severe fever" can be considered as a first word of interest, and "sore throat" can be considered as a second word of interest.

In any case, the entity component 112 can electronically apply named entity recognition to the plain text clinical sentence 104, so as to identify the word of interest 202.

Figure 4:
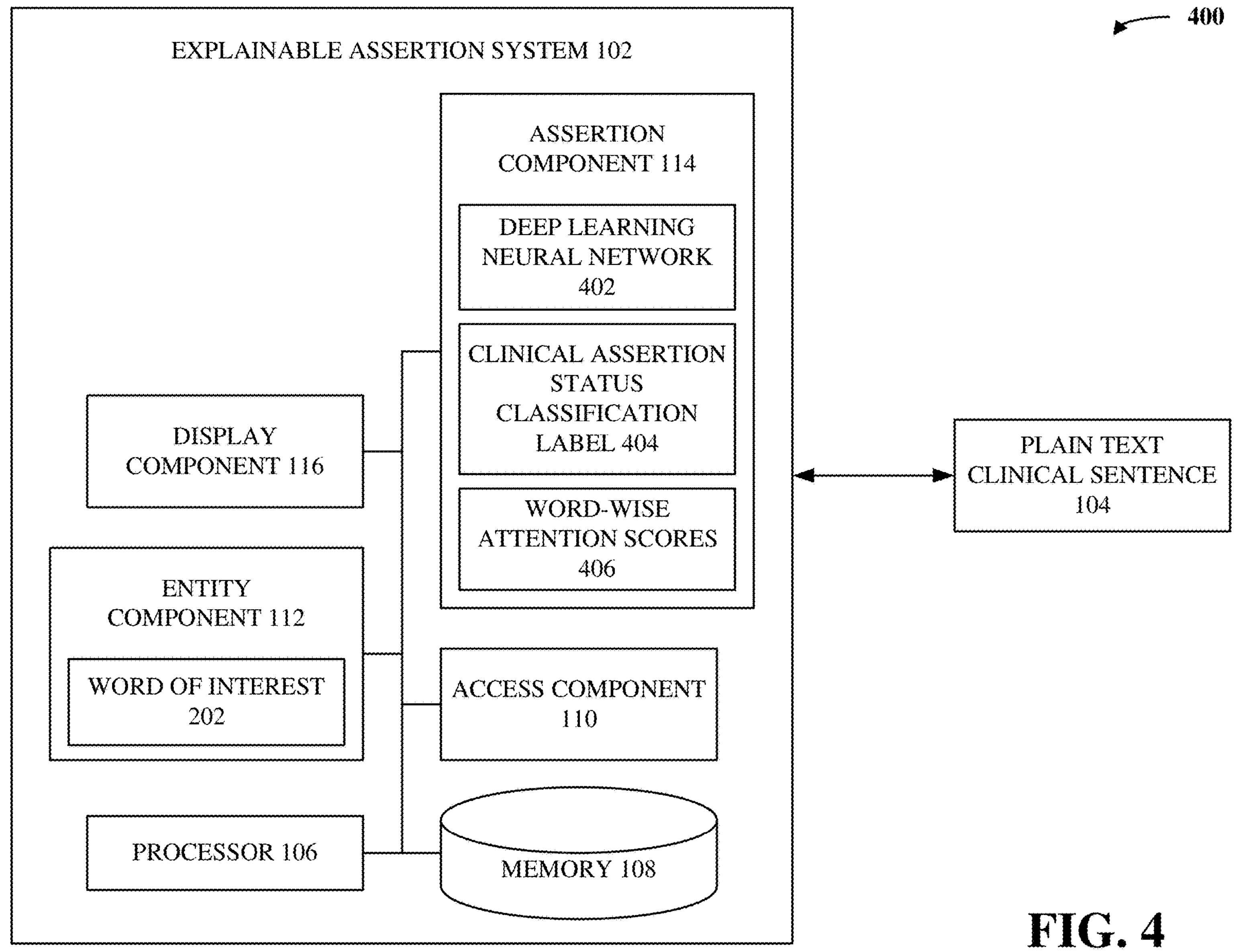
FIG. 4 illustrates a block diagram of an example, non-limiting system including a first deep learning neural network, a clinical assertion status classification label, and a set of word-wise attention scores that facilitates systems and methods for providing explainability of natural language processing in accordance with one or more embodiments described herein.

FIG. 4 illustrates a block diagram of an example, non-limiting system 400 including a first deep learning neural network, a clinical assertion status classification label, and a set of word-wise attention scores that can facilitate systems and methods for providing explainability of natural language processing in accordance with one or more embodiments described herein. As shown, the system 400 can, in some cases, comprise the same components as the system 200, and can further comprise a deep learning neural network 402, a clinical assertion status classification label 404, and a set of word-wise attention scores 406.

In various embodiments, the assertion component 114 can electronically store, electronically maintain, electronically control, or otherwise electronically access the deep learning neural network 402. In various instances, the deep learning neural network 402 can have or otherwise exhibit any suitable deep learning internal architecture. For instance, the deep learning neural network 402 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

In various aspects, the deep learning neural network 402 can be configured to perform assertion status classification on an inputted sentence. Accordingly, in various instances, the assertion component 114 can electronically flag or otherwise mark the word of interest 202 within the plain text clinical sentence 104, and the assertion component 114 can electronically execute the deep learning neural network 402 on the flagged or marked version of the plain text clinical sentence 104. Such execution can cause the deep learning neural network 402 to produce the clinical assertion status classification label 404. Furthermore, the deep learning neural network 402 can comprise a hidden attention layer that is configured to calculate a respective attention score for each word of an inputted sentence. Accordingly, such execution can further cause the deep learning neural network 402 to internally compute the set of word-wise attention scores 406. Non-limiting aspects are described with respect to FIGS. 5-6.

Figure 5:
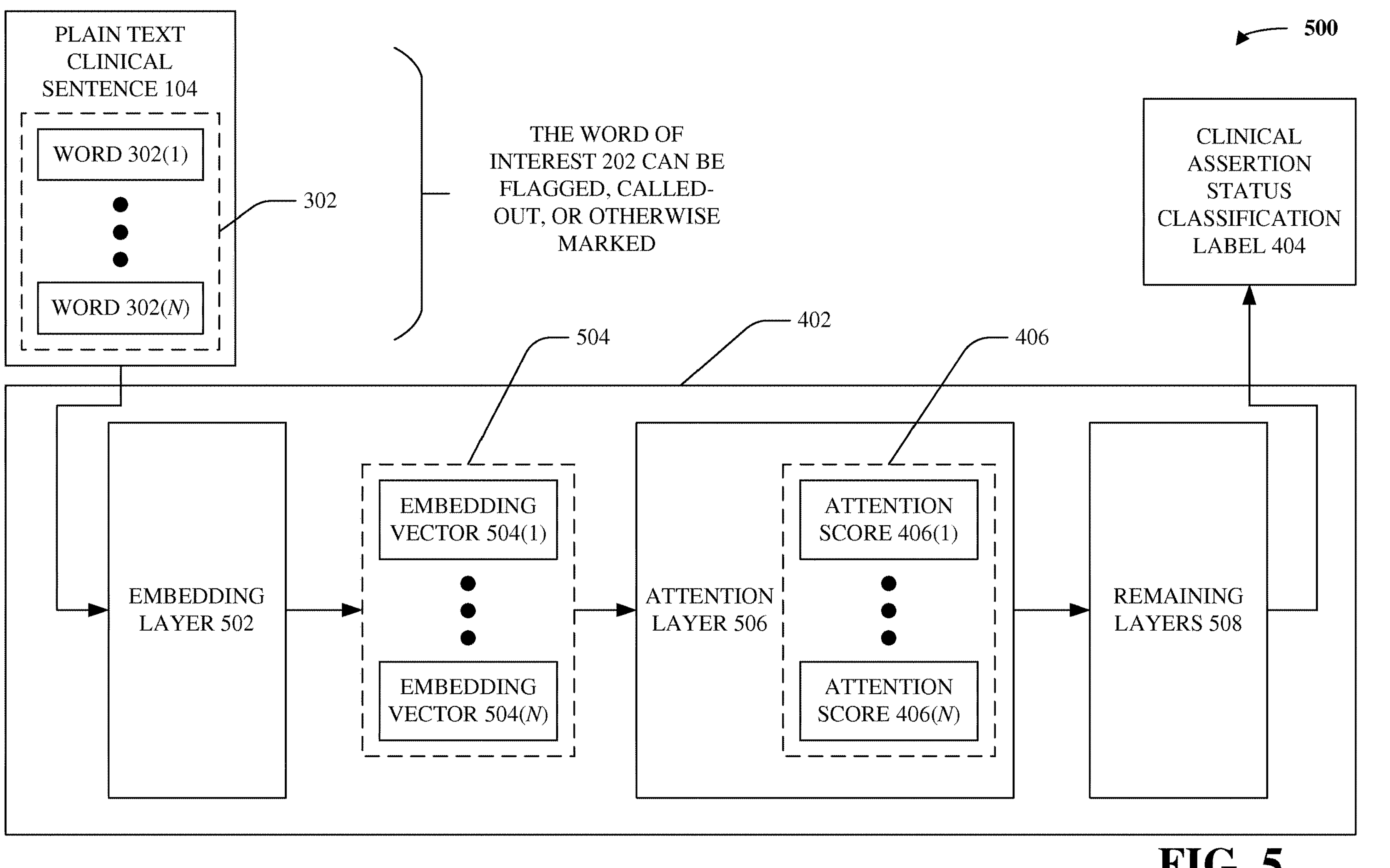
FIGS. 5-6 illustrate example, non-limiting block diagrams showing how a clinical assertion status classification label and a set of word-wise attention scores can be computed in accordance with one or more embodiments described herein.
Figure 6:
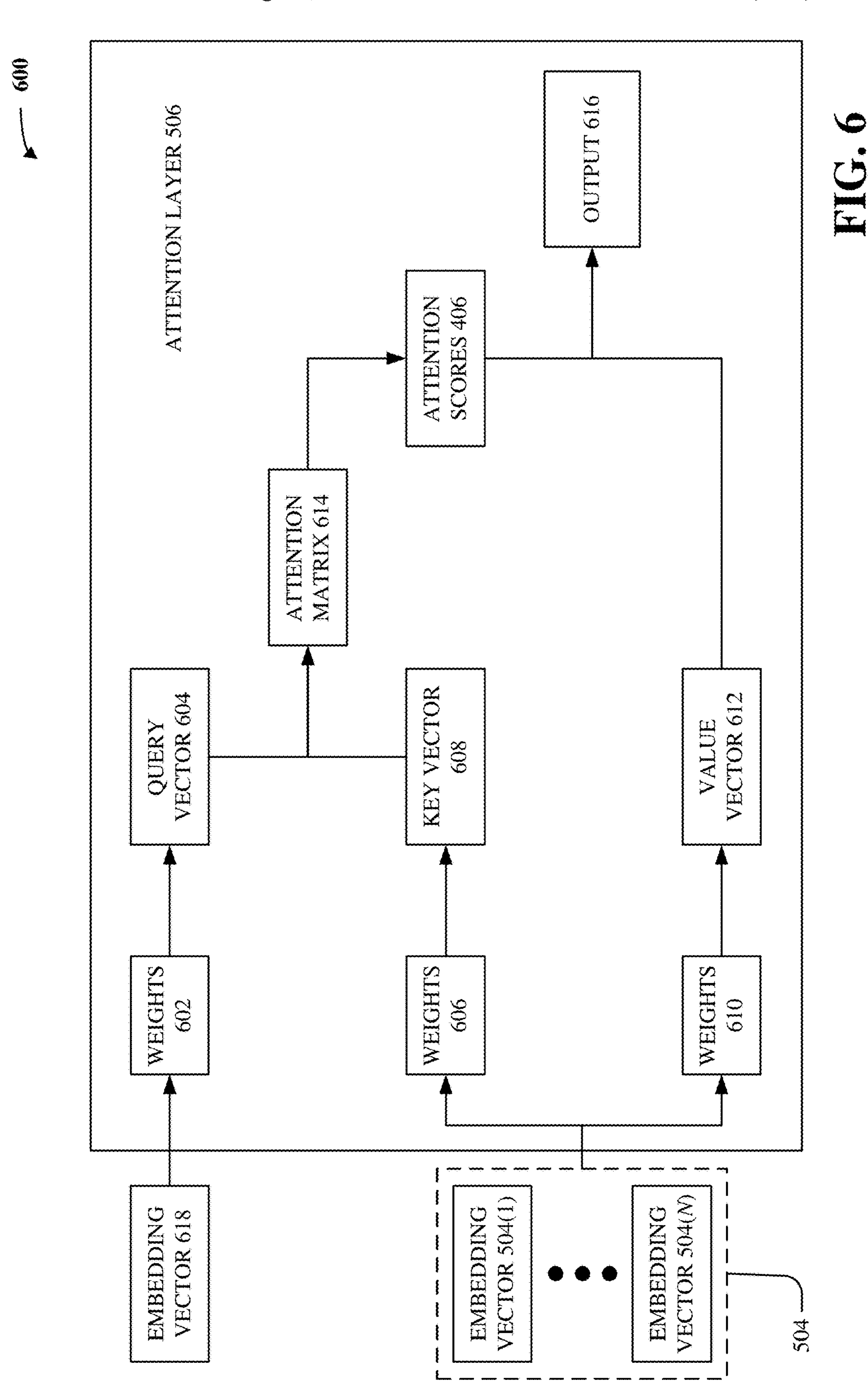

FIGS. 5-6 illustrate example, non-limiting block diagrams 500 and 600 showing how the clinical assertion status classification label 404 and the set of word-wise attention scores 406 can be computed in accordance with one or more embodiments described herein.

First, consider FIG. 5. As shown in the non-limiting example of FIG. 5, the deep learning neural network 402 can comprise an embedding layer 502, an attention layer 506, and one or more remaining layers 508.

In various aspects, the embedding layer 502 can be considered as an input layer of the deep learning neural network 402. In various instances, as shown, the assertion component 114 can electronically flag, electronically mark, electronically call-out, or otherwise electronically tag the word of interest 202 in the plain text clinical sentence 104, and the assertion component 114 can electronically feed or route that flagged, marked, called-out, or tagged version of the plain text clinical sentence 104 to the embedding layer 502. In various cases, that flagged, marked, called-out, or tagged version of the plain text clinical sentence 104 can complete a forward pass through the embedding layer 502, which can cause the embedding layer 502 to produce a set of embedding vectors 504. In various aspects, the set of embedding vectors 504 can respectively correspond (e.g., in one-to-one fashion) to the sequence of words 302. Accordingly, since the sequence of words 302 can comprise n words, the set of embedding vectors 504 can comprise n vectors: an embedding vector 504(1) to an embedding vector **504(*n*). In various instances, each of the set of embedding vectors 504 can be any suitable latent vector representation of a respective one of the sequence of words 302. As a non-limiting example, the embedding vector 504(1) can be a latent vector representation of the word 302(1), and the embedding vector 504(*n*) can be a latent vector representation of the word 302(*n*). In various cases, any two of the set of embedding vectors 504 can have the same dimensionality (e.g., the same total cardinality of numerical elements) as each other. In various aspects, the embedding layer 502 can generate the set of embedding vectors 504 via any suitable techniques. As a non-limiting example, the embedding layer 502 can utilize Embeddings from Language Model (ELMo) techniques. As another non-limiting example, the embedding layer 502** can utilize Global Vectors for Word Representation (GloVe) techniques.

In various aspects, the attention layer 506 can be located immediately downstream of the embedding layer 502. In various instances, the attention layer 506 can receive the set of embedding vectors 504 as input, the set of embedding vectors 504 can complete a forward pass through the attention layer 506, and such forward pass can cause the attention layer 506 to produce the set of word-wise attention scores 406. In various cases, as shown, the set of word-wise attention scores 406 can respectively correspond (e.g., in one-to-one fashion) to the set of embedding vectors 504. Thus, since the set of embedding vectors 504 can comprise n vectors, the set of word-wise attention scores 406 can comprise n scores: an attention score 406(1) to an attention score **406(*n*). In various aspects, each of the set of word-wise attention scores 406 can be a scalar weight whose magnitude can indicate how important or how unimportant a respective one of the set of embedding vectors 504, and thus a respective one of the sequence of words 302, is with respect to classifying the assertion status of the word of interest 202. As a non-limiting example, the attention score 406(1) can correspond to the embedding vector 504(1), and thus to the word 302(1). So, the attention score 406(1) can be a scalar whose magnitude can discretely or continuously range between any suitable minimum value (e.g., 0) and any suitable maximum value (e.g., 1), and whose magnitude indicates how dispositive or how contributory the embedding vector 504(1), and thus the word 302(1), is (in the opinion of the attention layer 506) for performing assertion status classification on the word of interest 202. As another non-limiting example, the attention score 406(*n*) can correspond to the embedding vector 504(*n*), and thus to the word 302(*n*). So, the attention score 406(*n*) can be a scalar whose magnitude can discretely or continuously range between the minimum value (e.g., 0) and the maximum value (e.g., 1), and whose magnitude indicates how dispositive or how contributory the embedding vector 504(*n*), and thus the word 302(*n*), is (in the opinion of the attention layer 506) for performing assertion status classification on the word of interest 202. If the attention layer 506 assigns a higher-magnitude attention score (e.g., closer to 1) to any given word of the plain text clinical sentence 104, this can be considered as indicating that the attention layer 506 has determined that that given word is rather important for classifying the assertion status of the word of interest 202. In contrast, if the attention layer 506 instead assigns a lower-magnitude attention score (e.g., closer to 0) to any given word of the plain text clinical sentence 104, this can be considered as indicating that the attention layer 506 has determined that that given word is rather unimportant for classifying the assertion status of the word of interest 202. In various aspects, the attention layer 506 can compute the set of word-wise attention scores 406 in query-key-value fashion. Non-limiting aspects of the attention layer 506 are described with respect to FIG. 6**.

In various embodiments, as mentioned above, the word of interest 202 can be any one (or, in some cases, two or more adjacent ones) of the sequence of words 302. As also mentioned above, the set of embedding vectors 504 can respectively correspond to the sequence of words 302. In various aspects, whichever one (or, in some cases, two or more) of the set of embedding vectors 504 corresponds to or represents the word of interest 202 can be referred to as an embedding vector 618.

Now, in various instances, the attention layer 506 can comprise weights 602. In various cases, the weights 602 can be one or more scalars, one or more vectors, one or more matrices, one or more tensors, or any suitable combination thereof that can be learned during training (described later herein). In various aspects, the weights 602 can be applied (e.g., via one or more dot-product operations) to the embedding vector 618, and the numerical result of such weight application can be referred to as a query vector 604.

Likewise, in various instances, the attention layer 506 can comprise weights 606. In various cases, the weights 606 can be one or more scalars, one or more vectors, one or more matrices, one or more tensors, or any suitable combination thereof that can be learned during training. In various aspects, the weights 606 can be applied (e.g., via one or more dot-product operations) to all of the set of embedding vectors 504, and the numerical result of such weight application can be referred to as a key vector 608.

Similarly, in various instances, the attention layer 506 can comprise weights 610. In various cases, the weights 610 can be one or more scalars, one or more vectors, one or more matrices, one or more tensors, or any suitable combination thereof that can be learned during training. In various aspects, the weights 610 can be applied (e.g., via one or more dot-product operations) to all of the set of embedding vectors 504, and the numerical result of such weight application can be referred to as a value vector 612.

In various aspects, a cross-product can be computed between the query vector 604 and the key vector 608, and the numerical result of such cross-product can be referred to as an attention matrix 614. In some instances, the attention matrix 614 can be scaled by the square root of the dimension (e.g., norm, cardinality) of the key vector 608.

In various cases, the attention matrix 614 can be normalized and passed through a softmax function (e.g., or any other suitable activation function), and the numerical result can be referred to as the set of word-wise attention scores 406.

In various aspects, a cross-product can be computed between the set of word-wise attention scores 406 and the value vector 612, and the numerical result of such cross-product can be referred to as an output 616.

Referring back to FIG. 5, the output 616 can be passed from the attention layer 506 to the one or more remaining layers 508. In various aspects, the output 616 can complete a forward pass through the one or more remaining layers 508. In various instances, this can cause the one or more remaining layers 508 to compute the clinical assertion status classification label 404. In various cases, the one or more remaining layers 508 can comprise any suitable number of any suitable types of neural network layers. As a non-limiting example, the one or more remaining layers 508 can comprise any suitable number of long short-term memory (LSTM) layers that utilize softmax activation functions.

In any case, the clinical assertion status classification label 404 can be any suitable electronic data (e.g., one or more scalars, one or more vectors, one or more matrices, one or more tensors, one or more character strings, or any suitable combination thereof) that can indicate, convey, or otherwise represent to which one of two or more defined assertion status classes the word of interest 202 is predicted or inferred to belong. As a non-limiting example, such two or more defined assertion status classes can include a present class, which can be considered as indicating that the plain text clinical sentence 104 asserts or states that whatever discrete, medical, semantic concept is represented by the word of interest 202 is presently affecting or pertaining to the medical patient. As another non-limiting example, such two or more defined assertion status classes can include an absent class, which can be considered as indicating that the plain text clinical sentence 104 asserts or states that whatever discrete, medical, semantic concept is represented by the word of interest 202 is not presently affecting or pertaining to the medical patient. As even another non-limiting example, such two or more defined assertion status classes can include an uncertain class, which can be considered as indicating that the plain text clinical sentence 104 asserts or states that it is not known whether whatever discrete, medical, semantic concept is represented by the word of interest 202 is presently affecting or pertaining to the medical patient. As still another non-limiting example, such two or more defined assertion status classes can include an historical class, which can be considered as indicating that the plain text clinical sentence 104 asserts or states that whatever discrete, medical, semantic concept is represented by the word of interest 202 previously affected or pertained to the medical patient. As yet another non-limiting example, such two or more defined assertion status classes can include a conditional class, which can be considered as indicating that the plain text clinical sentence 104 asserts or states that whatever discrete, medical, semantic concept is represented by the word of interest 202 affects or pertains to the medical patient only under certain conditions. As another non-limiting example, such two or more defined assertion status classes can include a familial class, which can be considered as indicating that the plain text clinical sentence 104 asserts or states that whatever discrete, medical, semantic concept is represented by the word of interest 202 has affected or pertained to a familial relative of the medical patient. As yet another non-limiting example, such two or more defined assertion status classes can include a recommended class, which can be considered as indicating that the plain text clinical sentence 104 asserts or states that whatever discrete, medical, semantic concept is represented by the word of interest 202 is recommended to be applied to the medical patient.

Note that, in various aspects, implementation of softmax activations in the one or more remaining layers 508 can be considered as computing a probability distribution over the two or more defined assertion status classes, and the clinical assertion status classification label 404 can be considered as identifying or indicating whichever of those two or more defined assertion status classes has a highest probability value.

In various embodiments, the display component 116 of the explainable assertion system 102 can electronically render, on any suitable electronic display, screen, or monitor, the clinical assertion status classification label 404. In various aspects, the display component 116 can also electronically extract the set of word-wise attention scores 406 from the attention layer 506, and can electronically render, on the electronic display, screen, or monitor and in conjunction with the clinical assertion status classification label, any suitable graphical representation of the set of word-wise attention scores 406. As some non-limiting examples, the graphical representation can be a color-coded chart, a bar graph, a histogram, or a pie chart.

In any case, the graphical representation can visually show how much or how little the deep learning neural network 402 relied upon each of the sequence of words 302 when generating the clinical assertion status classification label 404. Indeed, the graphical representation can visually emphasize whichever of the sequence of words 302 were assigned higher attention scores by the attention layer 506 and can visually de-emphasize whichever of the sequence of words 302 were assigned lower attention scores by the attention layer 506. Accordingly, a user or technician can manually view or inspect the graphical representation, so as to know, understand, or audit how or why the deep learning neural network 402 generated the clinical assertion status classification label 404. Accordingly, the user or technician can conclude whether or not the clinical assertion status classification label 404 is confident or trustworthy. As a non-limiting example, suppose that the graphical representation visually indicates that deep learning neural network 402 assigned higher attention scores to expected, reasonable, or appropriate words in the plain text clinical sentence 104. In such case, the user or technician can conclude that the clinical assertion status classification label 404 is the product of valid reasoning and is thus trustworthy or confident. As another non-limiting example, suppose that the graphical representation visually indicates that deep learning neural network 402 assigned higher attention scores to unexpected, unreasonable, or inappropriate words in the plain text clinical sentence 104. In such case, the user or technician can instead conclude that the clinical assertion status classification label 404 is the product of invalid reasoning and is thus untrustworthy or unconfident.

In this way, extraction and visualization of the set of word-wise attention scores 406 can be considered as increasing the explainability, interpretability, or transparency of the deep learning neural network 402.

Figure 7:
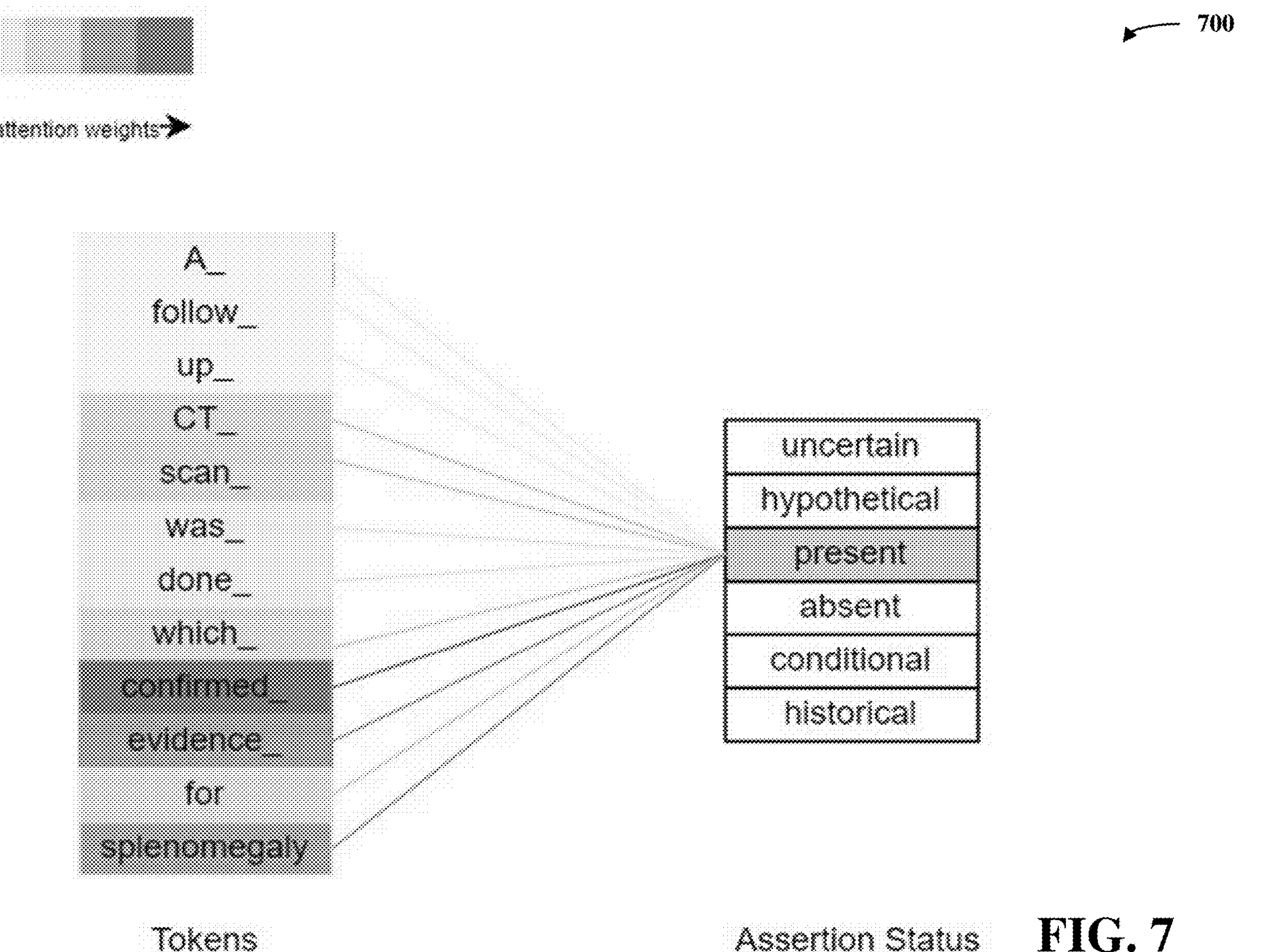
FIGS. 7-8 illustrate example, non-limiting visualizations showing how word-wise attention scores can be leveraged for explainability in accordance with one or more embodiments described herein.
Figure 8:
Figure 8:
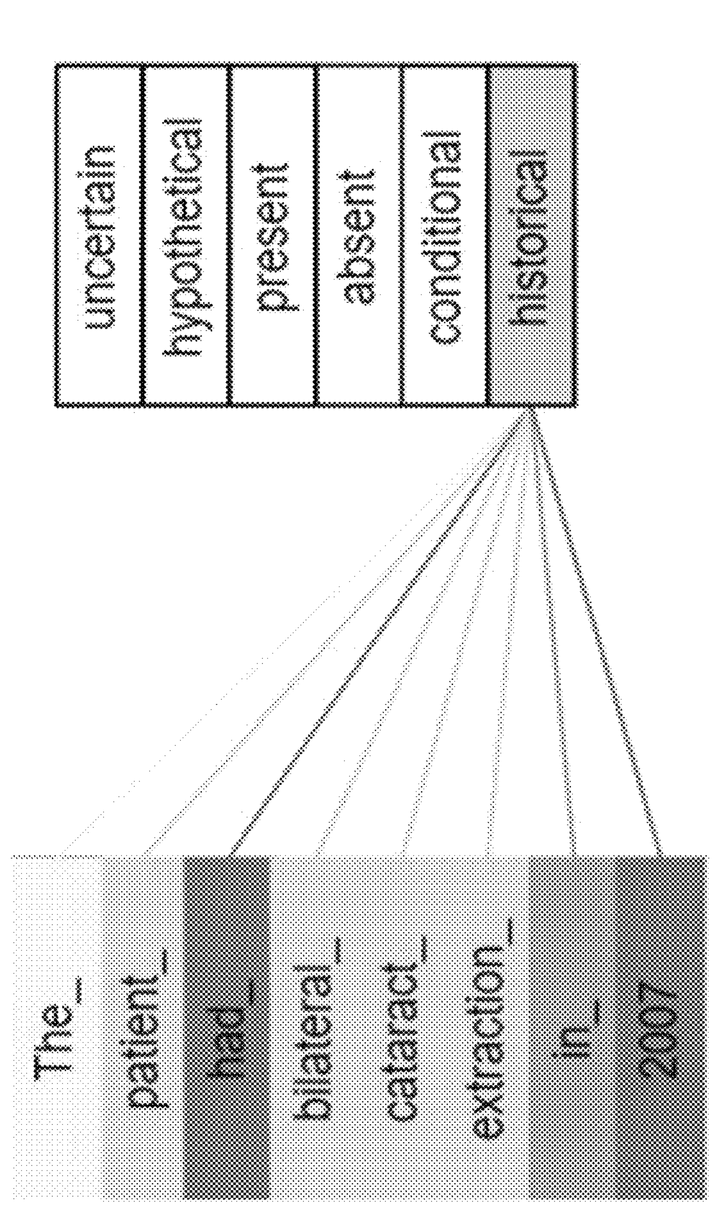

FIGS. 7-8 illustrate example, non-limiting visualizations 700 and 800 showing how word-wise attention scores can be leveraged for explainability in accordance with one or more embodiments described herein.

First, consider FIG. 7. In the non-limiting example of FIG. 7, the plain text clinical sentence 104 can be "A follow-up CT scan was done, which confirmed evidence for splenomegaly," the word of interest 202 can be "splenomegaly," and the clinical assertion status classification label 404 can indicate a present class. That is, the deep learning neural network 402 can have predicted or inferred that the plain text clinical sentence 104 is asserting or stating that "splenomegaly" is currently or presently afflicting the medical patient. As shown, the visualization 700 can comprise a color-coded chart that indicates which words of the plain text clinical sentence 104 received less focus (e.g., demarcated by lighter colors or shades) from the deep learning neural network 402 and which words of the plain text clinical sentence 104 received more focus (e.g., demarcated by darker colors or shades) from the deep learning neural network 402. As shown in the non-limiting example of FIG. 7, the deep learning neural network 402 focused on the words "confirmed," "evidence," and "splenomegaly." These words are substantively related to the word of interest 202. Moreover, these words seem to reasonably support a present classification. Thus, a user or technician that views the visualization 700 can conclude that the clinical assertion status classification label 404 is trustworthy or confident.

Next, consider FIG. 8. In the non-limiting example of FIG. 8, the plain text clinical sentence 104 can be "The patient had bilateral cataract extraction in 2007," the word of interest 202 can be "bilateral cataract extraction," and the clinical assertion status classification label 404 can indicate an historical class. That is, the deep learning neural network 402 can have predicted or inferred that the plain text clinical sentence 104 is asserting or stating that "bilateral cataract extraction" previously pertained to or was previously performed on the medical patient. As shown, the visualization 800 can comprise a color-coded chart that indicates which words of the plain text clinical sentence 104 received less focus (e.g., demarcated by lighter colors or shades) from the deep learning neural network 402 and which words of the plain text clinical sentence 104 received more focus (e.g., demarcated by darker colors or shades) from the deep learning neural network 402. As shown in the non-limiting example of FIG. 8, the deep learning neural network 402 focused on the words "had," "in," and "2007." These words are substantively related to the word of interest 202. Moreover, these words seem to reasonably support an historical classification. Thus, a user or technician that views the visualization 800 can conclude that the clinical assertion status classification label 404 is trustworthy or confident.

Figure 9:
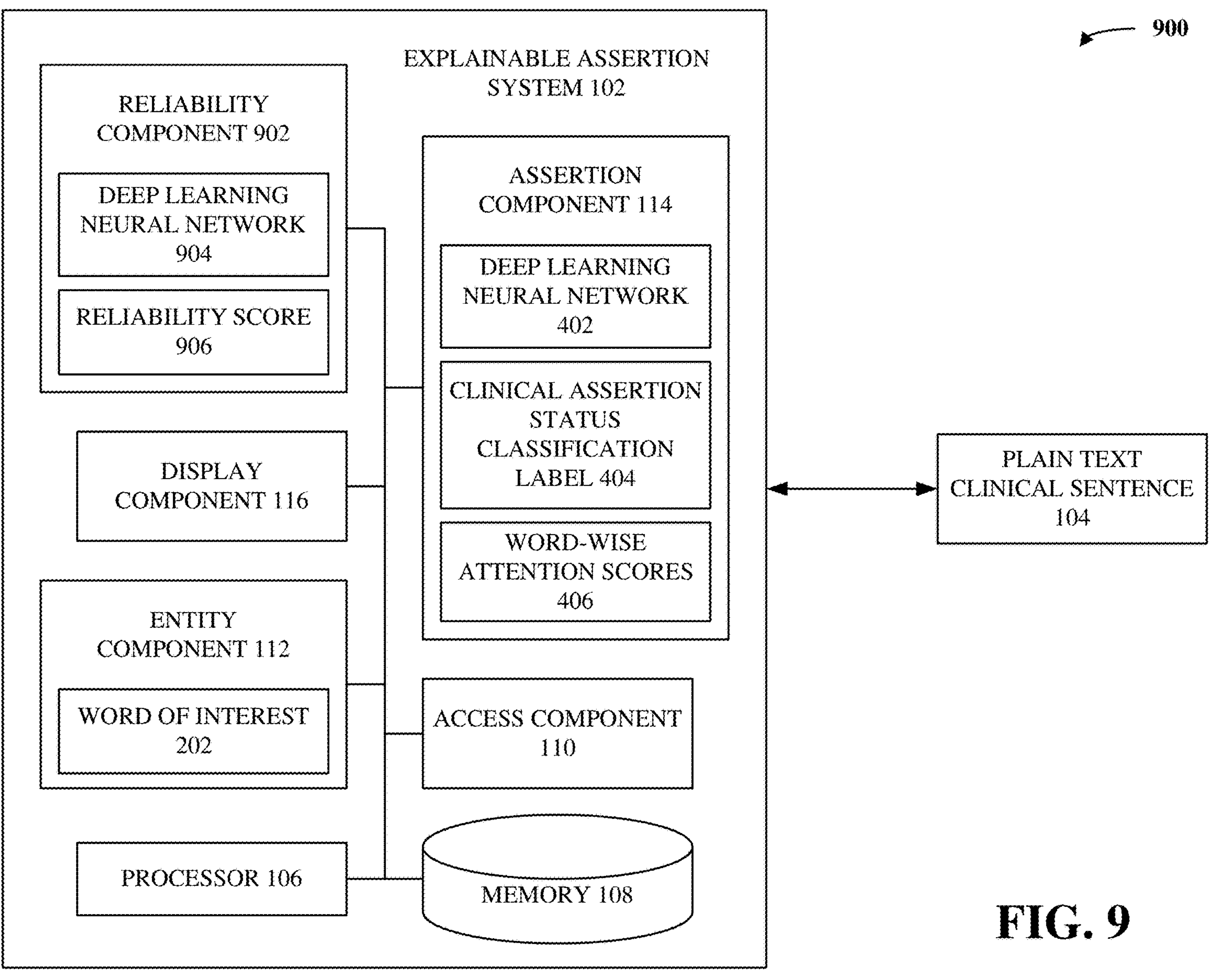
FIG. 9 illustrates a block diagram of an example, non-limiting system including a second deep learning neural network and a reliability score that facilitates systems and methods for providing explainability of natural language processing in accordance with one or more embodiments described herein.

FIG. 9 illustrates a block diagram of an example, non-limiting system 900 including a second deep learning neural network and a reliability score that can facilitate systems and methods for providing explainability of natural language processing in accordance with one or more embodiments described herein. As shown, the system 900 can, in some cases, comprise the same components as the system 400, and can further comprise a reliability component 902, a deep learning neural network 904, and a reliability score 906.

In various embodiments, the reliability component 902 can electronically store, electronically maintain, electronically control, or otherwise electronically access the deep learning neural network 904. In various instances, the deep learning neural network 904 can have or otherwise exhibit any suitable deep learning internal architecture. For instance, the deep learning neural network 904 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

In various aspects, the deep learning neural network 904 can be configured to estimate the reliability of an inputted assertion status classification, based on word-wise attention scores that correspond to that inputted assertion status classification. Accordingly, in various instances, the reliability component 902 can electronically execute the deep learning neural network 904 on the set of word-wise attention scores 406, and such execution can cause the deep learning neural network 904 to produce the reliability score 906. In various cases, the reliability score 906 can be considered as indicating how trustworthy, reliable, or well-reasoned the clinical assertion status classification label 404 is. Non-limiting aspects are described with respect to FIG. 10.

Figure 10:
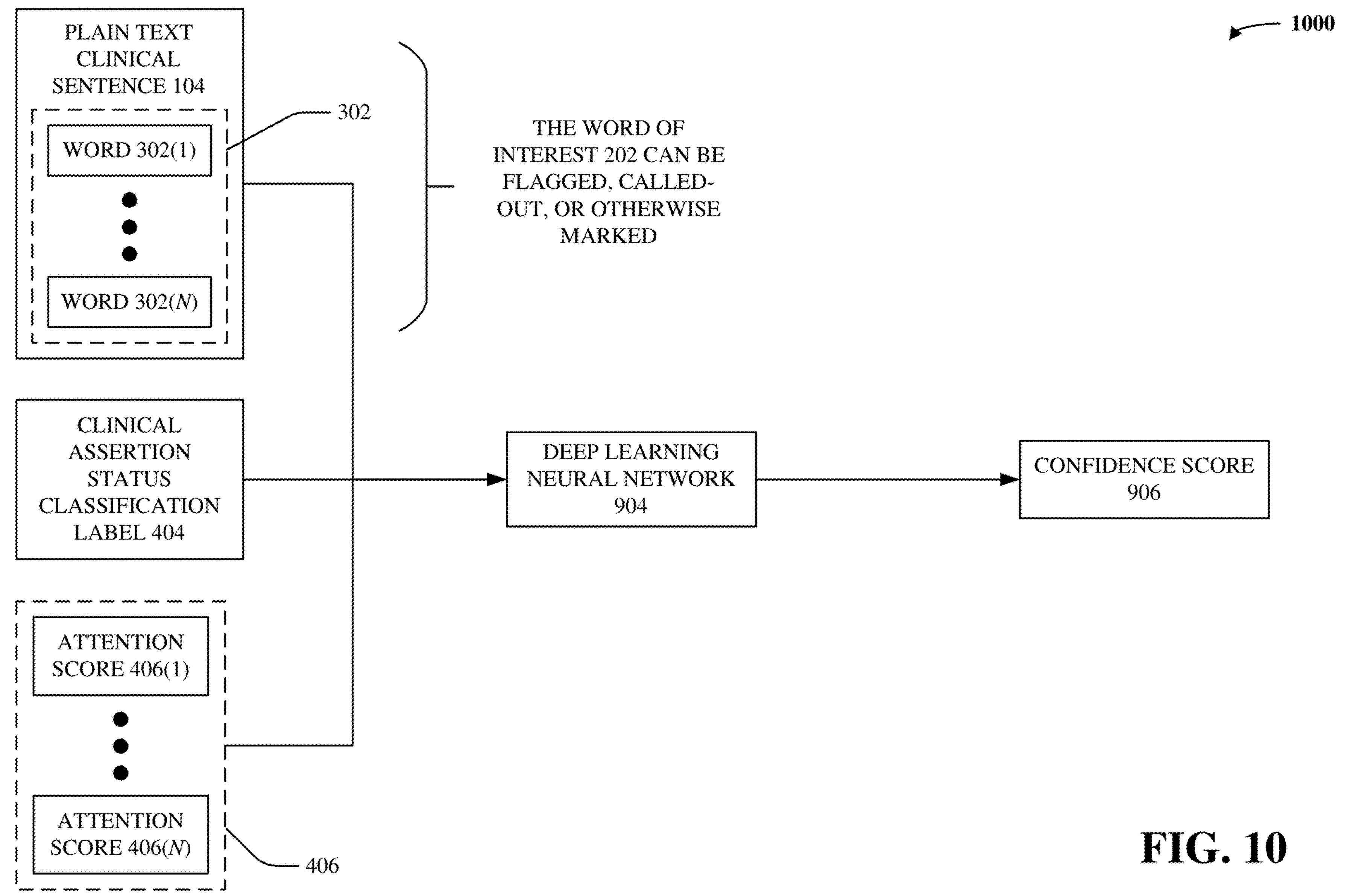
FIG. 10 illustrates an example, non-limiting block diagram showing how a reliability score can be generated in accordance with one or more embodiments described herein.

FIG. 10 illustrates an example, non-limiting block diagram 1000 showing how the reliability score 906 can be generated in accordance with one or more embodiments described herein.

In various embodiments, as mentioned above, the word of interest 202 can be flagged, marked, called-out, or otherwise tagged in the plain text clinical sentence 104. In various aspects, the reliability component 902 can electronically execute the deep learning neural network 904 on the tagged version of the plain text clinical sentence 104, on the clinical assertion status classification label 404, and on the set of word-wise attention scores 406. In various instances, such execution can yield the reliability score 906. More specifically, the reliability component 902 can concatenate the tagged version of the plain text clinical sentence 104, the clinical assertion status classification label 404, and the set of word-wise attention scores 406 together and can feed such concatenation to an input layer of the deep learning neural network 904. In various aspects, that concatenation can complete a forward pass through one or more hidden layers of the deep learning neural network 904. In various instances, an output layer of the deep learning neural network 904 can compute the reliability score 906, based on activations provided by the one or more hidden layers of the deep learning neural network 904.

In any case, the reliability score 906 can be a scalar whose magnitude can range from any suitable minimum value (e.g., 0) to any suitable maximum value (e.g., 1), and whose magnitude can be considered as indicating or representing how much reliability or trustworthiness should be placed in the clinical assertion status classification label 404. More specifically, the reliability score 906 can be considered as indicating whether or not the deep learning neural network 402 focused on reasonable, sensible, or appropriate words in the plain text clinical sentence 104 when generating the clinical assertion status classification label 404.

As a non-limiting example, suppose that the reliability score 906 is low in magnitude (e.g., closer to 0). In various cases, this can be interpreted to mean that the set of word-wise attention scores 406 are or seem to be (in the opinion of the deep learning neural network 904) unreasonable, unsensible, or inappropriate given the clinical assertion status classification label 404. Stated differently, this can mean that the deep learning neural network 904 believes that: the deep learning neural network 402 focused on the wrong or irrelevant words when creating the clinical assertion status classification label 404. Stated differently still, this can mean that the deep learning neural network 904 believes that: the deep learning neural network 402 utilized poor reasoning when predicting a clinical assertion status for the plain text clinical sentence 104. In such case, the reliability score 906 can be considered as signaling to a user or technician that the clinical assertion status classification label 404 is unreliable or untrustworthy (e.g., notwithstanding the fact that the deep learning neural network 402 might have high confidence in the clinical assertion status classification label 404).

As another non-limiting example, suppose instead that the reliability score 906 is high in magnitude (e.g., closer to 1). In various cases, this can be interpreted to mean that the set of word-wise attention scores 406 are or seem to be (in the opinion of the deep learning neural network 904) reasonable, sensible, or appropriate given the clinical assertion status classification label 404. Stated differently, this can mean that the deep learning neural network 904 believes that: the deep learning neural network 402 focused on the right or relevant words when creating the clinical assertion status classification label 404. Stated differently still, this can mean that the deep learning neural network 904 believes that: the deep learning neural network 402 utilized good reasoning when predicting a clinical assertion status for the plain text clinical sentence 104. In such case, the reliability score 906 can be considered as signaling to a user or technician that the clinical assertion status classification label 404 is reliable or trustworthy (e.g., can be in agreement with the high confidence that the deep learning neural network 402 has in the clinical assertion status classification label 404).

In this way, the deep learning neural network 904 can be considered as judging, checking, or evaluating how good of a job the deep learning neural network 402 did in generating the clinical assertion status classification label 404, based on the set of word-wise attention scores 406. That is, the deep learning neural network 904 can be configured to detect word-wise attention score patterns that are indicative or suggestive of good assertion status classification reasoning, as well as word-wise attention score patterns that are indicative or suggestive of bad assertion status classification reasoning.

In various aspects, the display component 116 can electronically render, on the electronic display, the reliability score 906, such that the user or technician can be informed of whether or not the clinical assertion status classification label 404 should be trusted.

As described herein, various embodiments utilize word-wise attention scores as an explanatory tool for ameliorating the black-box nature of assertion status classifiers.

Figure 11:
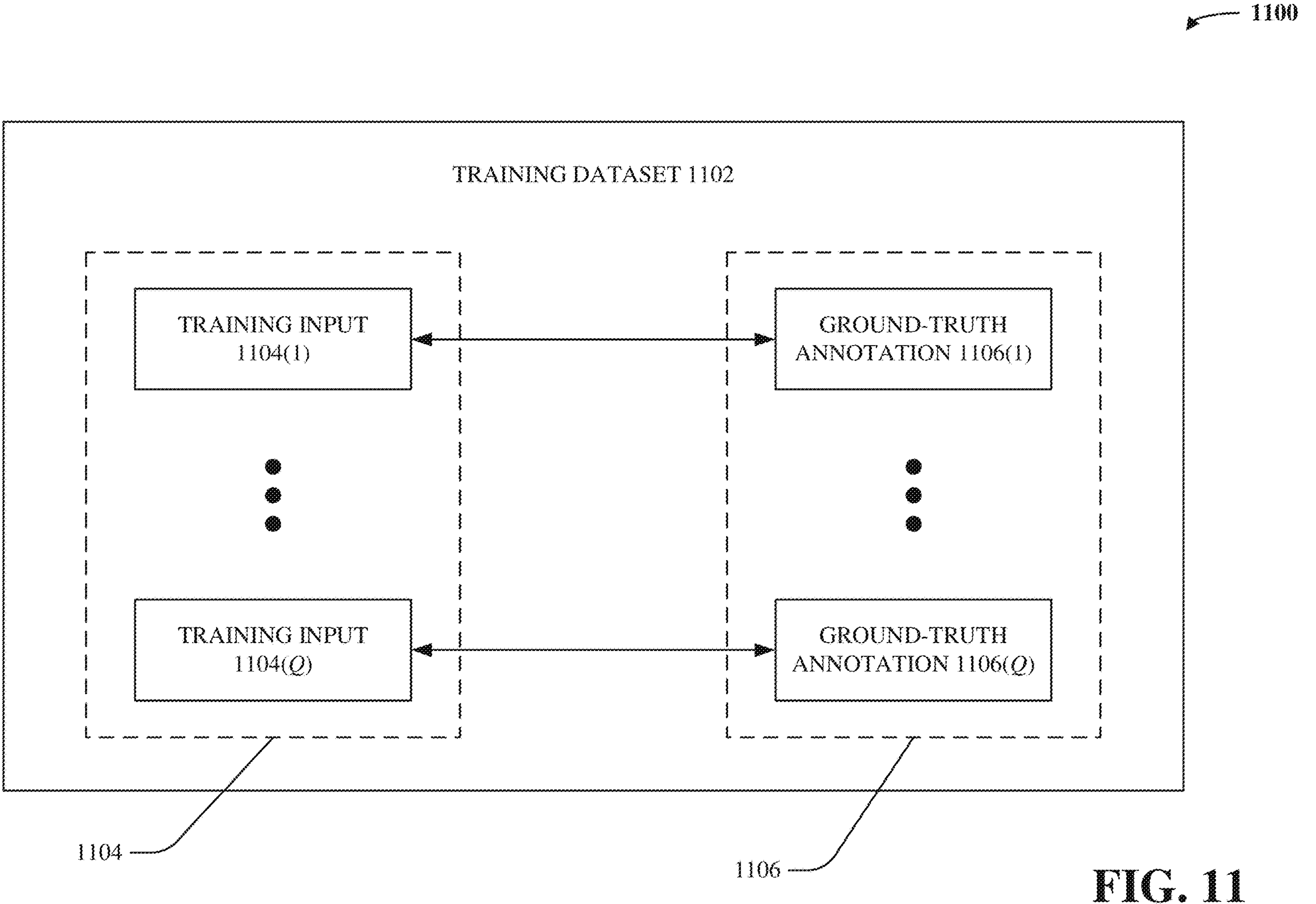
FIG. 11 illustrates an example, non-limiting block diagram of a training dataset in accordance with one or more embodiments described herein.
Figure 12:
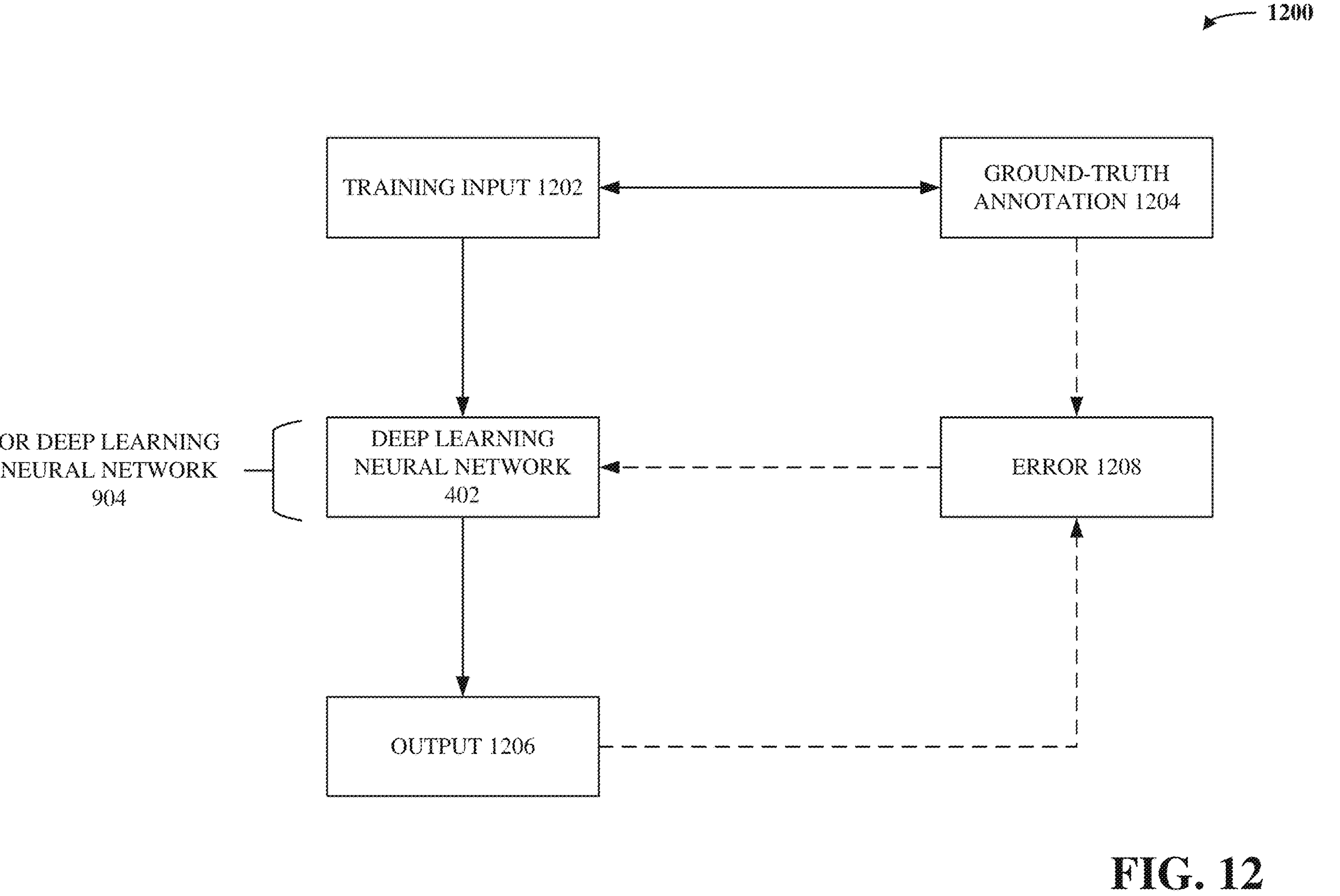
FIG. 12 illustrates an example, non-limiting block diagram showing how a deep learning neural network can be trained in accordance with one or more embodiments described herein.

In order for the clinical assertion status classification label 404, the set of word-wise attention scores 406, or the reliability score 906 to be accurate, correct, or reliable, the deep learning neural network 402 and the deep learning neural network 904 can first undergo training, as described with respect to FIGS. 11-12.

FIG. 11 illustrates an example, non-limiting block diagram 1100 of a training dataset 1102 in accordance with one or more embodiments described herein. In various aspects, the access component 110 can electronically receive, retrieve, or otherwise access, from any suitable source, the training dataset 1102, and the explainable assertion system 102 can electronically train the deep learning neural network 402 or the deep learning neural network 904 on the training dataset 1102.

In various aspects, the training dataset 1102 can comprise a set of training inputs 1104. In various instances, the set of training inputs 1104 can include q inputs for any suitable positive integer q: a training input 1104(1) to a training input 1104($q$). In various instances, if the training dataset 1102 is meant to train the deep learning neural network 402, then each of the set of training inputs 1104 can be a training plain text clinical sentence that is flagged, marked, or tagged with a respective word of interest. On the other hand, if the training dataset 1102 is meant to train the deep learning neural network 904, then each of the set of training inputs 1104 can be a concatenation of: a training plain text clinical sentence that is flagged, marked, or tagged with a respective word of interest; a training clinical assertion status classification label corresponding to that training plain text clinical sentence; and a set of training word-wise attention scores corresponding to that training plain text clinical sentence.

In various aspects, the training dataset 1102 can comprise a set of ground-truth annotations 1106 that can respectively correspond to the set of training inputs 1104. Accordingly, since the set of training inputs 1104 can have q inputs, the set of ground-truth annotations 1106 can have q annotations: a ground-truth annotation 1106(1) to a ground-truth annotation 1106($q$). In various instances, if the training dataset 1102 is meant to train the deep learning neural network 402, then each of the set of ground-truth annotations 1106 can be a correct or accurate clinical assertion status classification label that is known or deemed to correspond to a respective one of the set of training inputs 1104. On the other hand, if the training dataset 1102 is meant to train the deep learning neural network 904, then each of the set of ground-truth annotations 1106 can be a correct or accurate reliability score that is known or deemed to correspond to a respective one of the set of training inputs 1104.

FIG. 12 illustrates an example, non-limiting block diagram 1200 showing how the deep learning neural network 402 or the deep learning neural network 904 can be trained on the training dataset 1102 in accordance with one or more embodiments described herein.

In various aspects, prior to beginning training, trainable internal parameters (e.g., convolutional kernels, weight matrices, bias values) of the deep learning neural network 402 (or of the deep learning neural network 904) can be initialized in any suitable fashion (e.g., via random initialization).

In various aspects, a training input 1202 and a ground-truth annotation 1204 corresponding to the training input 1202 can be selected from the training dataset 1102. In various instances, the deep learning neural network 402 (or the deep learning neural network 904) can be executed on the training input 1202, thereby causing the deep learning neural network 402 (or the deep learning neural network 904) to produce an output 1206. More specifically, in some cases, an input layer of the deep learning neural network 402 (or of the deep learning neural network 904) can receive the training input 1202, the training input 1202 can complete a forward pass through one or more hidden layers of the deep learning neural network 402 (or of the deep learning neural network 904), and an output layer of the deep learning neural network 402 (or of the deep learning neural network 904) can compute the output 1206 based on activations provided by the one or more hidden layers of the deep learning neural network 402 (or of the deep learning neural network 904).

Note that the format, size, or dimensionality of the output 1206 can be dictated by the number, arrangement, sizes, or other characteristics of the neurons, convolutional kernels, or other internal parameters of the output layer (or of any other layers) of the deep learning neural network 402 (or of the deep learning neural network 904). Accordingly, the output 1206 can be forced to have any desired format, size, or dimensionality, by adding, removing, or otherwise adjusting characteristics of the output layer (or of any other layers) of the deep learning neural network 402 (or of the deep learning neural network 904).

In various aspects, if the output 1206 is produced by the deep learning neural network 402, the output 1206 can be considered as the predicted or inferred clinical assertion status classification label that the deep learning neural network 402 believes should correspond to the training input 1202. On the other hand, if the output 1206 is produced by the deep learning neural network 904, the output 1206 can be considered as the predicted or inferred reliability score that the deep learning neural network 904 believes should correspond to the training input 1202. In any case, the ground-truth annotation 1204 can be considered as whatever correct or accurate result (e.g., correct or accurate clinical assertion status classification label, correct or accurate reliability score) that is known or deemed to correspond to the training input 1202. Note that, if the deep learning neural network 402 (or the deep learning neural network 904) has so far undergone no or little training, then the output 1206 can be highly inaccurate. In other words, the output 1206 can be very different from the ground-truth annotation 1204.

In various aspects, an error 1208 (e.g., mean absolute error, mean squared error, cross-entropy error) between the output 1206 and the ground-truth annotation 1204 can be computed. In various instances, the trainable internal parameters of the deep learning neural network 402 (or of the deep learning neural network 904) can be incrementally updated, via backpropagation (e.g., stochastic gradient descent), based on the error 1208.

In various cases, such execution-and-update procedure can be repeated for any suitable number of training inputs (e.g., for each training input in the training dataset 1102). This can ultimately cause the trainable internal parameters of the deep learning neural network 402 (or of the deep learning neural network 904) to become iteratively optimized for accurately generating clinical assertion status classification labels (or reliability scores). In various aspects, any suitable training batch sizes, any suitable error/loss functions, or any suitable training termination criteria can be implemented.

Although the above description mainly describes the deep learning neural network 402 or the deep learning neural network 904 as being trained in supervised fashion, this is a mere non-limiting example for ease of illustration and explanation. In various cases, any other suitable training paradigms (e.g., unsupervised training, reinforcement learning) can be implemented to train the deep learning neural network 402 or the deep learning neural network 904.

Figure 13:
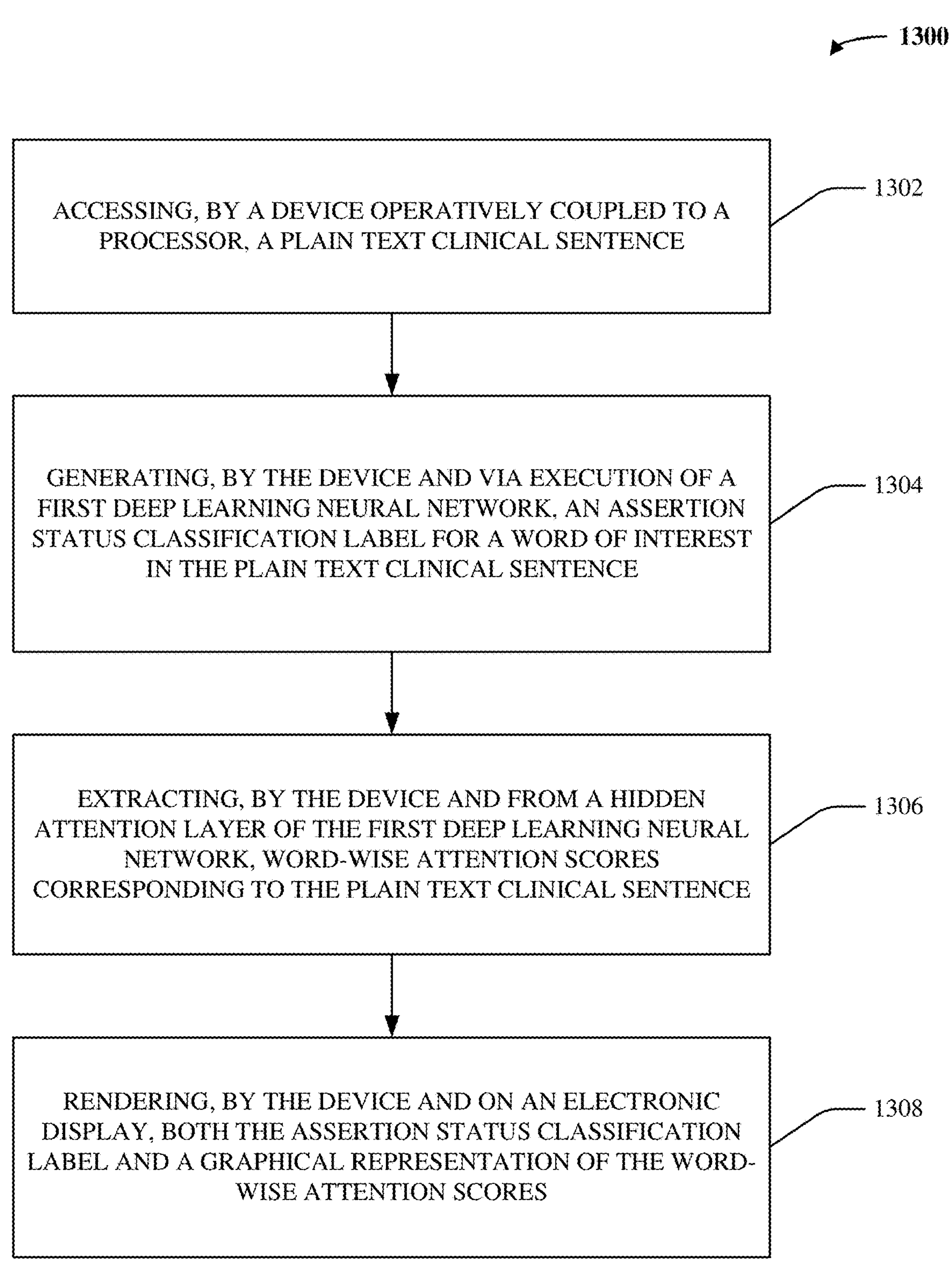
FIG. 13 illustrates a flow diagram of an example, non-limiting computer-implemented method that facilitates systems and methods for providing explainability of natural language processing in accordance with one or more embodiments described herein.

FIG. 13 illustrates a flow diagram of an example, non-limiting computer-implemented method 1300 that can facilitate systems and methods for providing explainability of natural language processing in accordance with one or more embodiments described herein. In various cases, the explainable assertion system 102 can facilitate the computer-implemented method 1300.

In various embodiments, act 1302 can include accessing, by a device (e.g., via 110) operatively coupled to a processor (e.g., 106), a plain text clinical sentence (e.g., 104).

In various aspects, act 1304 can include generating, by the device (e.g., via 114) and via execution of a first deep learning neural network (e.g., 402), an assertion status classification label (e.g., 404) for a word of interest (e.g., 202) in the plain text clinical sentence.

In various instances, act 1306 can include extracting, by the device (e.g., via 116) and from a hidden attention layer (e.g., 506) of the first deep learning neural network, word-wise attention scores (e.g., 406) corresponding to the plain text clinical sentence.

In various cases, act 1308 can include rendering, by the device (e.g., via 116) and on an electronic display, both the assertion status classification label and a graphical representation of the word-wise attention scores.

Although not explicitly shown in FIG. 13, the computer-implemented method 1300 can include: identifying, by the device (e.g., via 112), the word of interest via named entity recognition.

Although not explicitly shown in FIG. 13, an embedding layer (e.g., 502) of the first deep learning neural network can generate an embedding vector for each word of the plain text clinical sentence, thereby yielding a set of embedding vectors (e.g., 504).

Although not explicitly shown in FIG. 13, a first embedding vector (e.g., 618) in the set of embedding vectors can correspond to the word of interest, and the hidden attention layer can: compute a query vector (e.g., 604) by applying first learned weights (e.g., 602) to the first embedding vector; compute a key vector (e.g., 608) by applying second learned weights (e.g., 606) to the set of embedding vectors; compute a value vector (e.g., 612) by applying third learned weights (e.g., 610) to the set of embedding vectors; compute a first cross-product between the query vector and the key vector, thereby yielding an attention matrix (e.g., 614); apply a softmax function to the attention matrix, thereby yielding the word-wise attention scores; apply a second cross-product between the value vector and the word-wise attention scores, thereby yielding an output (e.g., 616); and pass the output to a long short-term memory layer (e.g., 508) of the first deep learning neural network.

Although not explicitly shown in FIG. 13, the assertion status classification label can indicate that the plain text clinical sentence belongs to an uncertain class, a hypothetical class, a present class, an absent class, a conditional class, or an historical class.

Although not explicitly shown in FIG. 13, the graphical representation of the word-wise attention scores can visually indicate which words of the plain text clinical sentence the first deep learning neural network focused on when generating the assertion status classification label.

Although not explicitly shown in FIG. 13, the computer-implemented method 1300 can include: determining, by the device (e.g., via 902) and via execution of a second deep learning neural network (e.g., 904), a reliability score (e.g., 906) for the assertion status classification label, based on the word-wise attention scores; and rendering, by the device (e.g., via 116), the reliability score on the electronic display. In various cases, the second deep learning neural network can receive as input the plain text clinical sentence, the assertion status classification label, and the word-wise attention scores, and the second deep learning neural network can produce as output the reliability score.

Although various embodiments described herein specifically apply to increasing the explainability or interpretability of assertion status classification, this is a mere non-limiting example for case of explanation and illustration. In various aspects, various embodiments described herein can be applied or extrapolated to any suitable natural language processing task (e.g., classification, segmentation, regression) that can be performed on a plain text sentence (e.g., even on non-clinical sentences, such as legal sentences, financial sentences, or marketing sentences). That is, no matter the natural language processing task that is desired to be performed on a plain text sentence, the explainability of that natural language processing task can be increased by extracting word-wise attention scores that are generated during performance of that natural language processing task.

Although various embodiments are described herein as pertaining to deep learning neural networks (e.g., 402, 904), this is a mere non-limiting example for case of explanation and illustration. Various other embodiments can instead be implemented via any suitable types of machine learning models (e.g., not limited only to neural networks). As some non-limiting examples, various other embodiments can instead be implemented via support vector machines, naïve Bayes models, linear regression models, logistic regression models, decision tree models, or random forest models.

Various embodiments can include or involve a computer program product for facilitating improved explainability for natural language processing via word-wise attention extraction. In various aspects, the computer program product can comprise a non-transitory computer-readable memory (e.g., 108) having program instructions embodied therewith. In various instances, the program instructions can be executable by a processor (e.g., 106) to cause the processor to: access a plain text sentence (e.g., 104); generate, via execution of a first deep learning neural network (e.g., 402), an inferencing task result (e.g., 404) based on the plain text sentence; extract, from a hidden attention layer (e.g., 506) of the first deep learning neural network, word-wise attention scores (e.g., 406) corresponding to the plain text sentence; and render, on an electronic display, both the inferencing task result and a graphical representation of the word-wise attention scores. In various cases, the graphical representation of the word-wise attention scores can visually indicate which words of the plain text sentence the first deep learning neural network focused on when generating the inferencing task result. In various aspects, the program instructions can be further executable to cause the processor to: determine, via execution of a second deep learning neural network (e.g., 904), a reliability score (e.g., 906) for the inferencing task result, based on the word-wise attention scores; and render the reliability score on the electronic display. In various instances, the second deep learning neural network can receive as input the plain text sentence, the inferencing task result, and the word-wise attention scores, and the second deep learning neural network can produce as output the reliability score.

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by f(z)=confidence (class). Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

Figure 14:
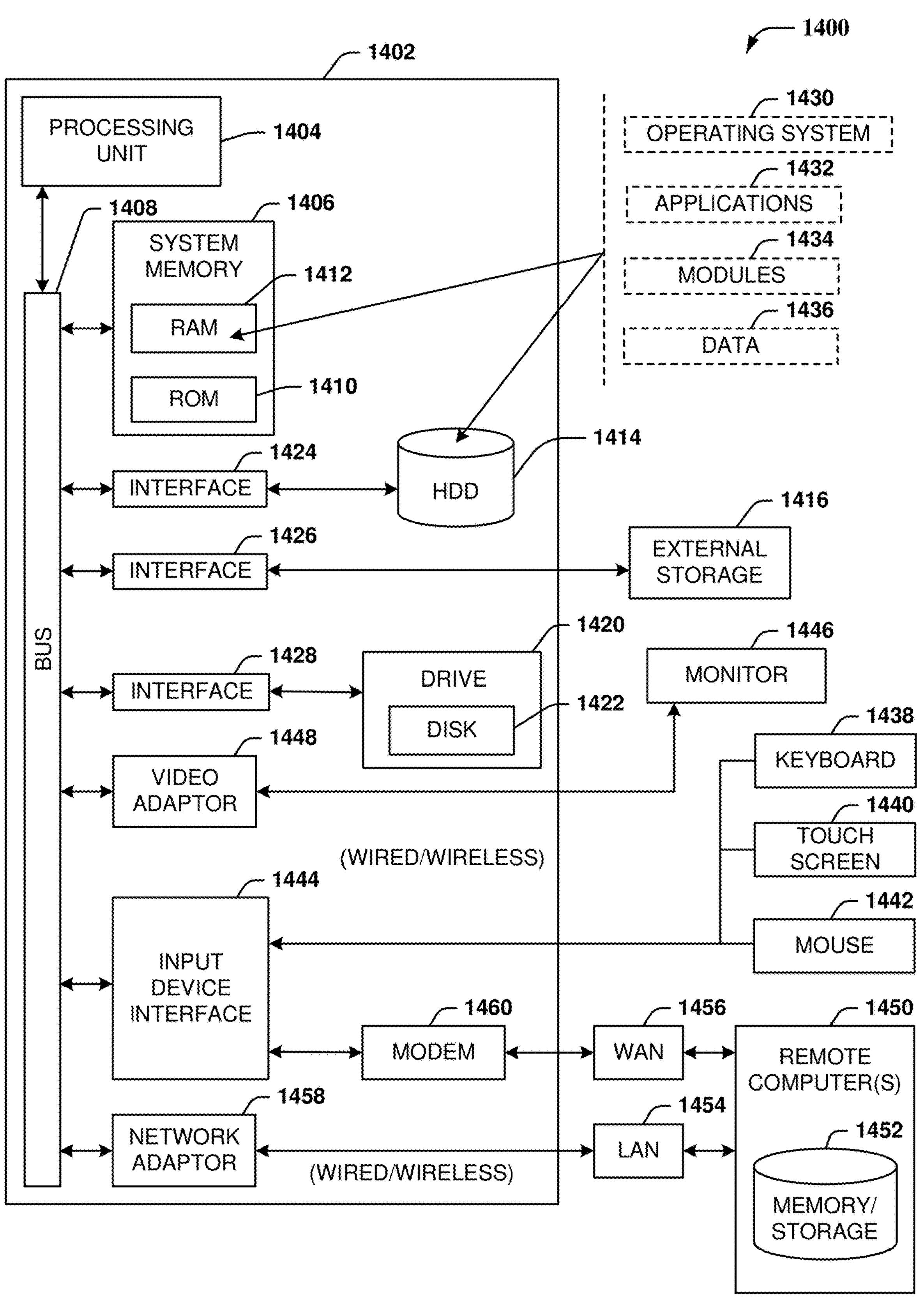
FIG. 14 illustrates a block diagram of an example, non-limiting operating environment in which one or more embodiments described herein can be facilitated.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and a drive 1420, e.g., such as a solid state drive, an optical disk drive, which can read or write from a disk 1422, such as a CD-ROM disc, a DVD, a BD, etc. Alternatively, where a solid state drive is involved, disk 1422 would not be included, unless separate. While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and drive 1420 can be connected to the system bus 1408 by an HDD interface 1424, an external storage interface 1426 and a drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above, such as but not limited to a network virtual machine providing one or more aspects of storage or processing of information. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 15:
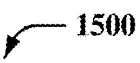
FIG. 15 illustrates an example networking environment operable to execute various implementations described herein.
Figure 15:
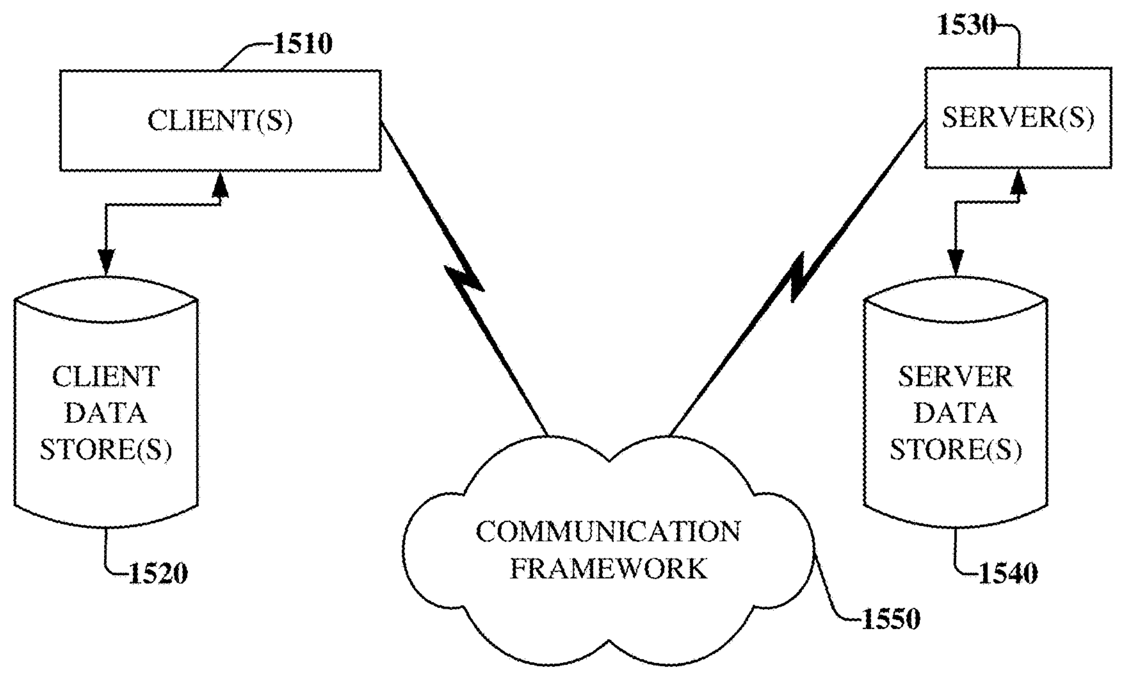

FIG. 15 is a schematic block diagram of a sample computing environment 1500 with which the disclosed subject matter can interact. The sample computing environment 1500 includes one or more client(s) 1510. The client(s) 1510 can be hardware or software (e.g., threads, processes, computing devices). The sample computing environment 1500 also includes one or more server(s) 1530. The server(s) 1530 can also be hardware or software (e.g., threads, processes, computing devices). The servers 1530 can house threads to perform transformations by employing one or more embodiments as described herein, for example. One possible communication between a client 1510 and a server 1530 can be in the form of a data packet adapted to be transmitted between two or more computer processes. The sample computing environment 1500 includes a communication framework 1550 that can be employed to facilitate communications between the client(s) 1510 and the server(s) 1530. The client(s) 1510 are operably connected to one or more client data store(s) 1520 that can be employed to store information local to the client(s) 1510. Similarly, the server (s) 1530 are operably connected to one or more server data store(s) 1540 that can be employed to store information local to the servers 1530.

Various embodiments may be a system, a method, an apparatus or a computer program product at any possible technical detail level of integration. The computer program product can include a computer readable storage medium (or media) having computer readable program instructions thereon for causing a processor to carry out aspects of various embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform various aspects.

Various aspects are described herein with reference to flowchart illustrations or block diagrams of methods, apparatus (systems), and computer program products according to various embodiments. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that various aspects can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a processor that executes computer-executable components stored in a non-transitory computer-readable memory, wherein the computer-executable components comprise:

an access component that accesses a plain text clinical sentence;

an assertion component that generates, via execution of a first machine learning model, an assertion status classification label for a word of interest in the plain text clinical sentence, wherein the first machine learning model comprises a hidden attention layer that assigns word-wise attention scores to words of the plain text clinical sentence and wherein the assertion status classification label is generated based at least in part on the word-wise attention scores;

a display component that extracts, from the hidden attention layer of the first machine learning model, the word-wise attention scores corresponding to the plain text clinical sentence and renders, on an electronic display, both the assertion status classification label and a graphical representation of the word-wise attention scores corresponding to the classifier's reliance on the words of the plain text clinical sentence; and a reliability component that determines, via execution of a second machine learning model, a reliability score for the assertion status classification label, based on the word-wise attention scores, and wherein the display component renders the reliability score on the electronic display, wherein the second machine learning model receives as input the plain text clinical sentence, the assertion status classification label, and the word-wise attention scores, and wherein the second machine learning model produces as output the reliability score.

2. The system of claim 1, wherein the computer-executable components further comprise:

an entity component that identifies the word of interest via named entity recognition.

3. The system of claim 2, wherein an embedding layer of the first machine learning model generates an embedding vector for each word of the plain text clinical sentence, thereby yielding a set of embedding vectors.

4. The system of claim 3, wherein a first embedding vector in the set of embedding vectors corresponds to the word of interest, and wherein the hidden attention layer:

computes a query vector by applying first learned weights to the first embedding vector;

computes a key vector by applying second learned weights to the set of embedding vectors;

computes a value vector by applying third learned weights to the set of embedding vectors;

computes a first cross-product between the query vector and the key vector, thereby yielding an attention matrix;

applies a softmax function to the attention matrix, thereby yielding the word-wise attention scores;

computes a second cross-product between the value vector and the word-wise attention scores, thereby yielding an output; and passes the output to a long short-term memory layer of the first machine learning model.

5. The system of claim 1, wherein the assertion status classification label indicates that the plain text clinical sentence belongs to an uncertain class, a present class, an absent class, a conditional class, or an historical class.

6. The system of claim 1, wherein the graphical representation of the word-wise attention scores visually indicates which words of the plain text clinical sentence the first machine learning model focused on when generating the assertion status classification label.

7. A computer-implemented method, comprising:

accessing, by a device operatively coupled to a processor, a plain text clinical sentence;

generating, by the device and via execution of a first machine learning model, an assertion status classification label for a word of interest in the plain text clinical sentence, wherein the first machine learning model comprises a hidden attention layer that generates word-wise attention scores for respective words of the plain text clinical sentence, and wherein the assertion status classification label is generated based at least in part on the word-wise attention scores;

extracting, by the device and from the hidden attention layer of the first machine learning model, the word-wise attention scores for the respective words of the plain text clinical sentence;

rendering, by the device and on an electronic display, both the assertion status classification label and a graphical representation of the word-wise attention scores corresponding to the respective words of the plain text clinical sentence as an explanation of the assertion status classification label; and determining, by the device and via execution of a second machine learning model, a reliability score for the assertion status classification label, based on the word-wise attention scores; and rendering, by the device, the reliability score on the electronic display, wherein the second machine learning model receives as input the plain text clinical sentence, the assertion status classification label, and the word-wise attention scores, and wherein the second machine learning model produces as output the reliability score.

8. The computer-implemented method of claim 7, further comprising:

identifying, by the device, the word of interest via named entity recognition.

9. The computer-implemented method of claim 8, wherein an embedding layer of the first machine learning model generates an embedding vector for each word of the plain text clinical sentence, thereby yielding a set of embedding vectors.

10. The computer-implemented method of claim 9, wherein a first embedding vector in the set of embedding vectors corresponds to the word of interest, and wherein the hidden attention layer:

computes a query vector by applying first learned weights to the first embedding vector;

computes a key vector by applying second learned weights to the set of embedding vectors;

computes a value vector by applying third learned weights to the set of embedding vectors;

computes a first cross-product between the query vector and the key vector, thereby yielding an attention matrix;

applies a softmax function to the attention matrix, thereby yielding the word-wise attention scores;

computes a second cross-product between the value vector and the word-wise attention scores, thereby yielding an output; and passes the output to a long short-term memory layer of the first machine learning model.

11. The computer-implemented method of claim 7, wherein the assertion status classification label indicates that the plain text clinical sentence belongs to an uncertain class, a present class, an absent class, a conditional class, or an historical class.

12. The computer-implemented method of claim 7, wherein the graphical representation of the word-wise attention scores visually indicates which words of the plain text clinical sentence the first machine learning model focused on when generating the assertion status classification label.

13. A computer program product for facilitating systems and methods for providing explainability of natural language processing, the computer program product comprising a non-transitory computer-readable memory having program instructions embodied therewith, the program instructions executable by a processor to cause the processor to:

access a plain text sentence;

generate, via execution of a first machine learning model, an inferencing task result based on the plain text sentence, wherein the first machine learning model comprises a hidden attention layer that generates word-wise attention scores for respective words of the plain text sentence, and wherein the inferencing task result is generated based at least in part on the word-wise attention scores generated by the hidden attention layer;

extract, from the hidden attention layer of the first machine learning model, the word-wise attention scores for the respective words of the plain text sentence;

render, on an electronic display, both the inferencing task result and a graphical representation of the word-wise attention scores corresponding to the respective words of the plain text sentence as an explanation of the inferencing task result; and determine, via execution of a second machine learning model, a reliability score for the inferencing task result, based on the word-wise attention scores; and render the reliability score on the electronic display, wherein the second machine learning model receives as input the plain text sentence, the inferencing task result, and the word-wise attention scores, and produces as output the reliability score.

14. The computer program product of claim 13, wherein the graphical representation of the word-wise attention scores visually indicates which words of the plain text sentence the first machine learning model focused on when generating the inferencing task result.

* * * * *